(12) United States Patent
Shenfield

(10) Patent No.: US 8,321,852 B2
(45) Date of Patent: *Nov. 27, 2012

(54) SYSTEM AND METHOD FOR EXTENDING A COMPONENT-BASED APPLICATION PLATFORM WITH CUSTOM SERVICES

(75) Inventor: Michael Shenfield, Richmond Hill (CA)

(73) Assignee: Research In Motion Limited, Waterloo, Ontario (CA)

( * ) Notice: Subject to any disclaimer, the term of this patent is extended or adjusted under 35 U.S.C. 154(b) by 104 days.

This patent is subject to a terminal disclaimer.

(21) Appl. No.: 12/907,301

(22) Filed: Oct. 19, 2010

(65) Prior Publication Data
US 2011/0035742 A1 Feb. 10, 2011

Related U.S. Application Data

(63) Continuation of application No. 11/346,286, filed on Feb. 3, 2006, now Pat. No. 7,836,439.

(51) Int. Cl.
*G06F 9/44* (2006.01)
*G06F 9/45* (2006.01)
(52) U.S. Cl. .................... 717/162; 717/122; 717/174
(58) Field of Classification Search .......... 717/162–164, 717/168–174, 121–122; 709/203
See application file for complete search history.

(56) References Cited

U.S. PATENT DOCUMENTS

| | | | | |
|---|---|---|---|---|
| 6,499,137 B1 * | 12/2002 | Hunt | ............ | 717/164 |
| 6,628,965 B1 * | 9/2003 | LaRosa et al. | ............ | 455/557 |
| 6,871,344 B2 * | 3/2005 | Grier et al. | ............ | 717/162 |
| 6,873,170 B2 * | 3/2005 | Asam et al. | ............ | 324/750.06 |
| 6,996,818 B2 * | 2/2006 | Jacobi et al. | ............ | 717/170 |
| 7,013,323 B1 * | 3/2006 | Thomas et al. | ............ | 709/203 |
| 7,073,170 B2 * | 7/2006 | Grier et al. | ............ | 717/162 |
| 7,146,609 B2 * | 12/2006 | Thurston et al. | ............ | 717/169 |
| 7,219,332 B2 * | 5/2007 | Gouge et al. | ............ | 717/121 |
| 7,243,346 B1 * | 7/2007 | Seth et al. | ............ | 717/163 |

(Continued)

OTHER PUBLICATIONS

Laborie et al, "Managing and querying efficiently distributed semantic multimedia metadata collections", IEEE, pp. 1-9, 2009.*

(Continued)

*Primary Examiner* — Anil Khatri
(74) *Attorney, Agent, or Firm* — Gowling Lafleur Henderson LLP

(57) ABSTRACT

A system and method for dynamically associating an application with an extension service to generate an extended, dynamically linked version of the application. The application is configurable for deployment on an electronic device and for subsequent interaction with the extension service during execution through communication messages defined in a structured definition language. The system and method include a parser module configured for analyzing a set of service metadata descriptors to identify a communication interface associated with the extension service, such that the service metadata descriptors describe the communication interface including structure and type of parameters expected by the extension service for use in manipulation of the communication messages. The system and method also include a linking module coupled to the parser module for using the communication interface and a reference to the extension service in the code of the application to build a runtime dynamic link between the extension service and the application to produce the executable application.

18 Claims, 9 Drawing Sheets

U.S. PATENT DOCUMENTS

| | | | | |
|---|---|---|---|---|
| 7,437,712 B1* | 10/2008 | Brown et al. | .................. | 717/122 |
| 7,461,374 B1* | 12/2008 | Balint et al. | .................. | 717/174 |
| 7,512,942 B2* | 3/2009 | Brown et al. | .................. | 717/174 |
| 7,574,705 B2* | 8/2009 | Taivalsaari et al. | ............ | 717/162 |
| 7,689,982 B1* | 3/2010 | Chen et al. | .................... | 717/168 |
| 7,831,965 B1* | 11/2010 | Pittore et al. | .................. | 717/165 |
| 7,844,964 B2* | 11/2010 | Marolia | ........................ | 717/172 |
| 8,095,911 B2* | 1/2012 | Ronen et al. | .................. | 717/122 |

OTHER PUBLICATIONS

Lam et al, "A multi version data model for executing real time transactions in mobile environment", ACM MobiDE, pp. 90-97, 2001.*

Morzy et al, "On querying of multiversion data warehouse", ACM DOLAP, pp. 92-101, 2004.*

Halb et al, "Towards a commercial adoption of linked open data for online content providers", ACM I-Semantics, pp. 1-8, 2010.*

\* cited by examiner

100 # SYSTEM AND METHOD FOR EXTENDING A COMPONENT-BASED APPLICATION PLATFORM WITH CUSTOM SERVICES

CROSS-REFERENCE TO RELATED APPLICATION

This application is a continuation of application Ser. No. 11/346,286, filed on Feb. 3, 2006, the entire content of which is hereby incorporated by reference for all purposes.

A portion of the disclosure of this patent document contains material which is subject to copyright protection. The copyright owner has no objection to the facsimile reproduction by any one of the patent document or patent disclosure, as it appears in the Patent and Trademark Office patent file or records, but otherwise reserves all copyrights whatsoever.

This application relates generally to runtime linking to application services and to interaction of the application with the linked application services.

BACKGROUND

Network applications are continuing to increase in complexity due to an ever expanding assortment of new services available for use with the applications. Therefore, an increasing amount of development resources are required to keep pace with coordinating the network applications to include these new services, typically based on user demand.

In compilation of the network applications, an exact definition of these services needs to be available (i.e. predefined) to the compiler in order to result in a successful executable application. For example, with current OSGi™ Alliance (formerly Open Services Gateway Initiative) Java™ applications, a JAR file of the network application contains a static manifest of all the implementation-specific Application Program Interfaces (APIs) specifying the functions available to external programs, including class definitions. Runtime links can only be successfully created between the cooperating network application and services when all these services (and the application) are available to be loaded into the same Java™ process. A further example of current compilation procedures is with the use of header files, which represents a static library of all implementation-specific APIs to be used in compilation of the network application. For instance, based on the contents of the header file, the compiler finds the corresponding envelope of linked services and finds a Dynamic Link Library (DLL) that contains the services needed by the network application code being compiled. One disadvantage with the current compilation procedures is that the code of the network application must be compiled with predefined (i.e. static) definitions of the services that were locally available prior to starting the compilation process. A second disadvantage with the current compilation procedures, and implementation of the executable application, is that there is no standard communication interface provided between the application and the services linked to the application.

The systems and methods as disclosed herein provide an execution environment to obviate or mitigate at least some of the above presented disadvantages.

BRIEF DESCRIPTION OF THE DRAWINGS

These and other features will become more apparent in the following detailed description in which reference is made to the appended drawings wherein.

DESCRIPTION OF THE PREFERRED EMBODIMENTS

Figure 1:
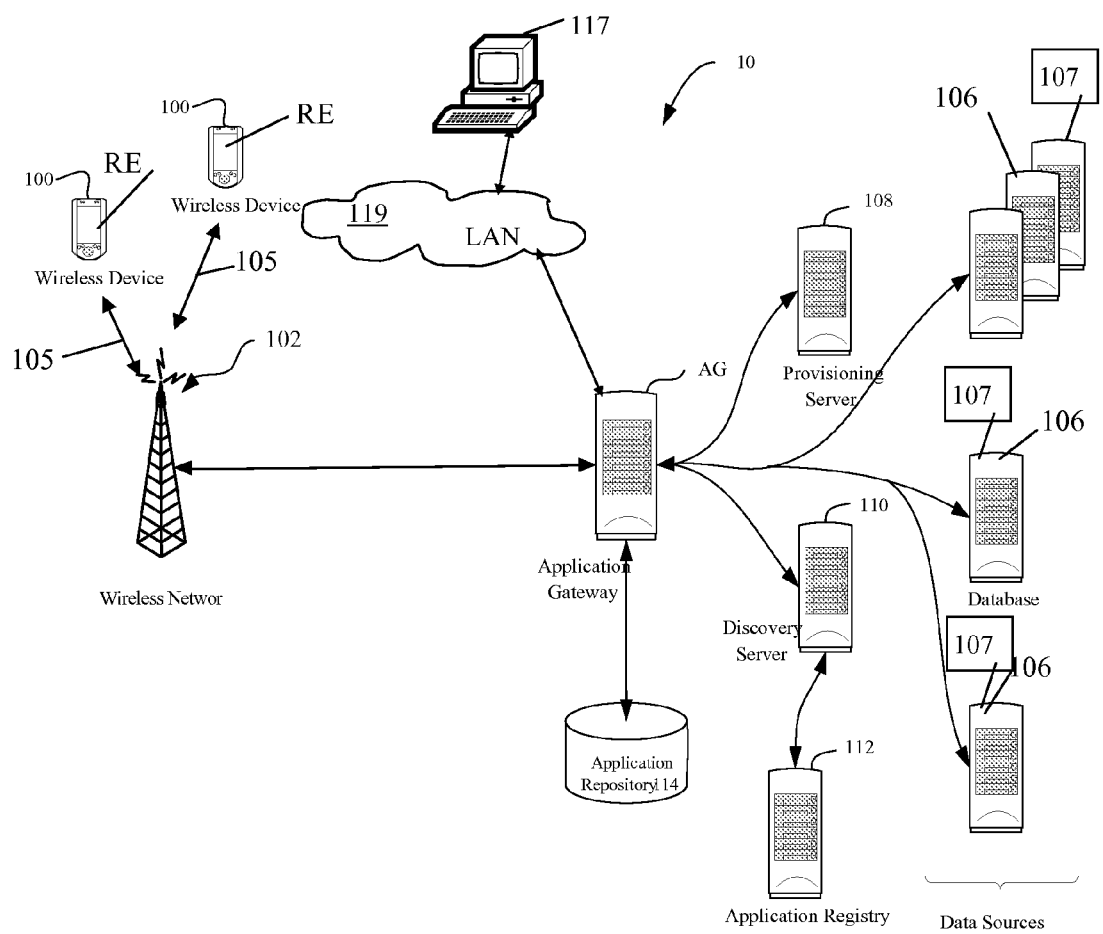
FIG. 1 is a block diagram of a communication system.

One aspect provided is a method for dynamically generating an extended, dynamically linked version of an application on a mobile device.

A request for an extended service of the installed application is on the mobile device. The extended service is described in a service document, including service metadata descriptors to identify a communication interface associated with the extension service. The application interacts with the extension service through communication messages defined in a structured definition language. The service metadata descriptors describe the communication interface including structure and type of parameters expected by the extension service for use in manipulation of the communication messages. The service metadata descriptors are distinct from an application metadata descriptor of the application. The extension service for is searched for more matches if the requested service is located remotely or there are additional extension service options. The extension service is installed. The service document is updated with the service metadata descriptors. The extension service is a local extension service configured for hosting on the mobile device, or a remote extension service configured for hosting on a network entity communicating with the mobile device via the network.

A second aspect provided is a mobile device executing an extended, dynamically linked version of an application. The mobile device comprises a service manager selecting an extension service from a plurality of extension services and dynamically loading the selected extension service. The service manager comprises an input module receiving a request for an extended service of the installed application. The extended service is described in a service document. The service document includes service metadata descriptors to identify a communication interface associated with the extension service. The application interacts with the extension service through communication messages defined in a structured definition language. The service metadata descriptors describe the communication interface including structure and type of parameters expected by the extension service for use in manipulation of the communication messages. The service metadata descriptors are distinct from an application metadata descriptor of the application. The service manager further comprises a search module searching the extension service for more matches if the requested service is located remotely or there are additional extension service options; and an install module installing the extension service, and updating the service document with the service metadata descriptors. The extension service is a local extension service configured for hosting on the mobile device, or a remote extension service configured for hosting on a network entity communicating with the mobile device via the network.

A third aspect provided is a computer readable storage medium coupled to a computer processor for providing instructions to the processor to execute a method for dynamically generating an extended, dynamically linked version of an application on a mobile device. The method comprises receiving a request for an extended service of the installed application. The extended service is described in a service document. The service document includes service metadata descriptors to identify a communication interface associated with the extension service. The application interacts with the extension service through communication messages defined in a structured definition language. The service metadata descriptors describe the communication interface including structure and type of parameters expected by the extension service for use in manipulation of the communication messages. The service metadata descriptors are distinct from an application metadata descriptor of the application. The method further comprises searching the extension service for more matches if the requested service is located remotely or there are additional extension service options; installing the extension service; and updating the service document with the service metadata descriptors. The extension service is a local extension service configured for hosting on the mobile device, or a remote extension service configured for hosting on a network entity communicating with the mobile device via the network.

The following description of network system 10 (see FIGS. 1 and 5) relates to enabling a device 100 to load custom services 107, 109 on demand, i.e. such as software to extend the functionality of already installed device 100 software. The device 100 can load these custom services 107, 109 over the air (OTA). The application 302 on the device 100 and the custom services 107, 109 are implemented using a shared contract, for example an Extensible Markup Language (XML)-defined API, that does not use any pre-compilation of the custom services 107, 109 with the application 302 code, as further discussed below.

Figure 2:
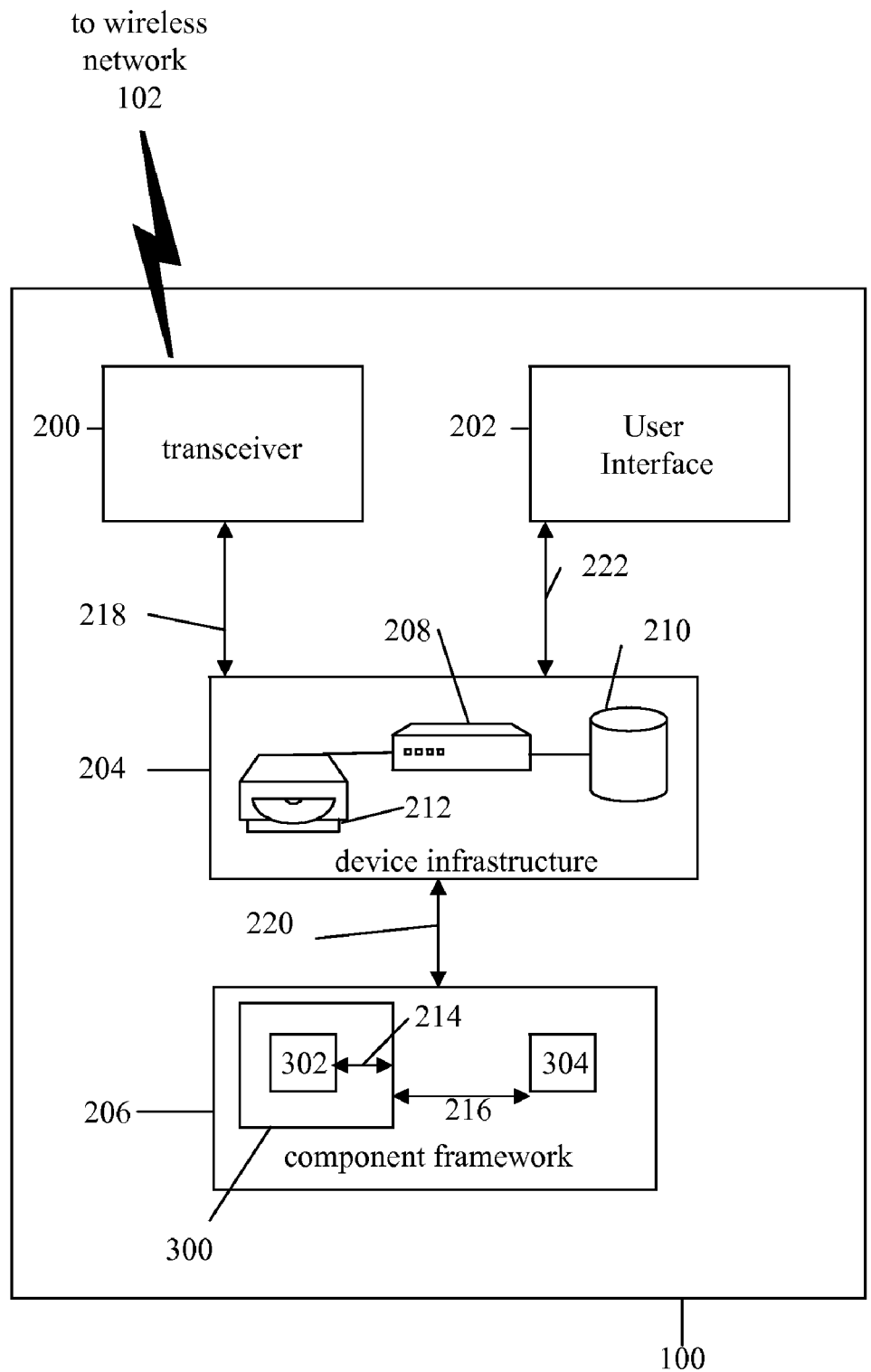
FIG. 2 is a block diagram of a mobile communication device of FIG. 1.
Figure 4:
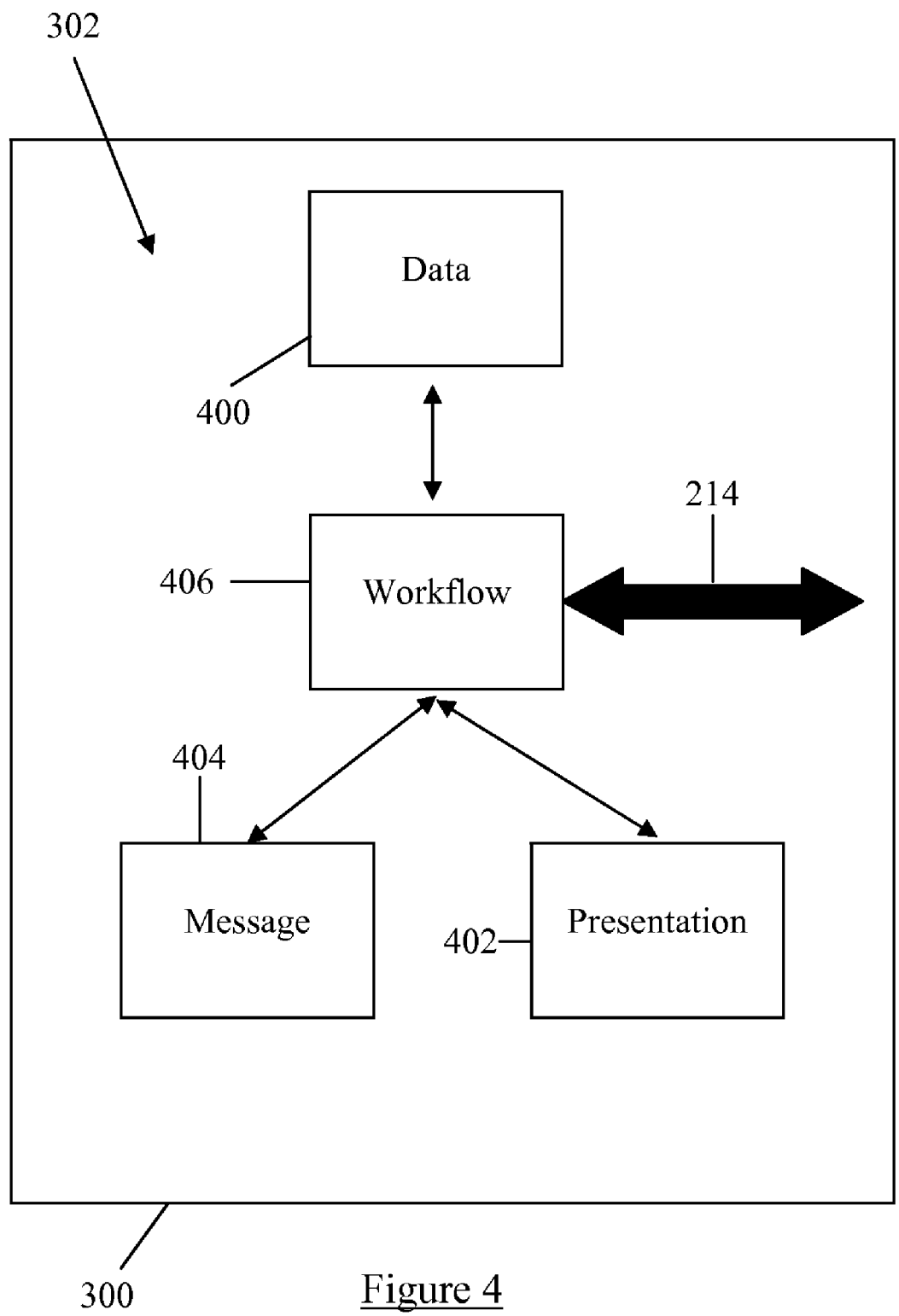
FIG. 4 is a block diagram of an example application of FIG. 2.

Referring to FIGS. 1, 2 and 4, the following provides a brief introduction of an example network system 10 with optional interaction between applications 302 and data sources 106 over a network 102 via an application gateway AG. The network system 10 provides an example application 302 embodiment for dynamic association of the extension services 107, 109 with the application 302, such that the extension service 107 is located remotely to the device 100 and the extension service 109 is located locally to the device 100. The extension service(s) 107, 109 and/or their parameter definitions are not included with the application code/definitions of the application 302. Rather, the extension service(s) 107, 109 are provided externally to the application 302 and are therefore configured for functional interaction via dynamic mediation with the complimentary configured application 302, as further described below. The extension services 107, 109 are considered as functionally part of the application 302, rather than physically, and the functional interaction of the application 302 with the extension services 107, 109 can optionally facilitate configuration of a communication device 100 (that also hosts the application 302) as a client of the data source 106. Otherwise, the extension services 107, 109 can provide assistance in execution of the application 302 for application 302 functionality that is not related to real-time application 302 nor to data source 106 interaction via messaging 99 (see FIG. 7).

The extension services 107, 109 are used to assist in execution of the application 302. The communication interaction between the extension services 107, 109 and the application 302 is done via service messaging 105 (e.g. using a shared messaging interface—such as defined in a structured definition language—between the application 302 and the extension services 107, 109), rather than using more traditional method/function calls used by traditional inter-application exchanges and client-server relationships (not shown). The dynamic binding/association of the extension services 107, 109 during provisioning of the application 302 on the device 100 may occur in different manners. For example, binding/association may occur dynamically for local interaction with services 109 hosted on the communication device 100; dynamically for remote interaction with services 107 available via the application gateway AG (or other third party network entity—not shown—such as a carrier or an ASP); or a combination thereof. Further, as discussed below, the extension services 107, 109 can be downloaded from the network 102 to the device 100, communicated with through a service proxy, and/or communicated with through communication interface information (e.g. metadata 322) for updating a service document 320 (see FIG. 5). The service document 320, for example a Deployment Descriptor (DD), is used to provide communication information (of messages 105) to the device 100 for the extension services 107, 109 associated with the application 302, and to assist a framework 206 of the device 100 in dynamic binding of the extension services 107, 109 with the application 302 when provisioned on the device 100. It is also recognized that the application 302 can be component-based (e.g. components 400, 402, 404, 406) and/or non-component-based (e.g. a compiled application—not shown), as desired.

Network System 10

Referring to FIG. 1, the network system 10 comprises the communication devices 100 for interacting, as desired, with one or more data sources 106 via the coupled network 102 (e.g. wireless and/or the Internet). It is recognized that the devices 100 can communicate directly (not shown) with the data sources 106 over the network system 10, rather than communicate through the application gateway AG. The devices 100 transmit and receive the request/response messages 99 (see FIG. 7), respectively, when in communication with the data sources 106. The devices 100 can operate as mobile clients of the data sources 106 by using the requests/response messages 99 in the form of message header information and associated data content, for example requesting and receiving product pricing and availability from an on-line merchant. For satisfying the appropriate requests/response messages 99, the data sources 106 can communicate with the application gateway AG through various protocols (such as but not limited to HTTP and component API) for exposing relevant business logic (methods of the data sources 106) to the applications 302 (see FIG. 2) hosted on the device 100. The data sources 106 can also provide extension service 107, 109 location information to facilitate dynamic binding by the device 100 of the remote 107 and/or local 109 extension services to the application 302, as further described below. Further, it is recognized that in the context of the network system 10 having the data source 106 is optional for interaction with the application 302, for example, the extension services 107, 109 could be loaded to enable device-local applications (e.g. a game, a calculator, etc.).

Referring again to FIG. 1, the communication devices 100 can interact with one or more backend data sources 106 (e.g. including a schema-based service or database that provides enterprise services used by the software applications 302) via the network 102. The devices 100 are devices such as but not limited to mobile telephones, PDAs, two-way pagers, or dual-mode communication devices. The network 10 can also have desktop computers 117 coupled though a local area network 119. The devices 100 and desktop computers 117 of the network 10 are hereafter referred to as the devices 100 for the sake of simplicity. The application gateway AG handles the request/response messages 99 (see FIG. 7) initiated by the application 302 as well as subscription notification messages 99 pushed to the device 100, as well as messaging 105 with the remote extension services 107. The Application Gateway AG can function as a Data Mapping Server for mediating messaging between a runtime environment RE on the device 100 and a backend server of the data sources 106. The runtime environment RE (including an intelligent application container 300) executes the applications 302 and provides access to common standard framework services 304 (see FIG. 5) for the application(s) 302, as well as the extension services 107, 109, as needed for functional execution of the applications 302.

For satisfying the appropriate messaging 99, 105 associated with the application(s) 302, the application gateway AG can communicate via the network 102 through various protocols, such as but not limited to HTTP and component API. The messages 99 are used to expose relevant business logic (methods of the data sources 106) to the applications 302, once provisioned on the device 100. In this sense, the provisioning process refers to the registration of the application 302 in the memory 210 of the device 100, such that the device 100 becomes a client of the data source 106. Further, it is recognized that the extension services 107, 109 are dynamically bound to the application 302 during the provisioning process, as specified through the metadata descriptors 322 of the service document 320. Further, the provisioning process can include both loading of the application 302 on the device 100 (including linking to all application dependencies and extension services 107, 109). It is recognized that the applications 302 can be downloaded/uploaded in relation to data sources 106 via the network 102 and application gateway AG directly to the devices 100. For example, the application gateway AG is coupled to a provisioning server 108 and a discovery server 110 for providing a mechanism for optimized over-the-air (OTA) provisioning of the applications 302, including capabilities for application 302 and/or extension service 107, 109 discovery from the device 100 as listed in a Universal Discovery Description and Integration (UDDI) (for example) registry 112. The service registry 112 can be part of the discovery service implemented by the server 110, and the registry 112 is used for publishing the URLs of the available extension services 107, 109.

Further, it is recognized that the registry 112 (or separate registry—not shown) can be used to discover available applications 302, and therefore the registry 112 can contain such as but not limited to a deployment descriptor (containing information such as application 302 name, version, and description) as well as the location of this application 302 in an application repository 114. Further, it is recognized that the registry 112 (or separate registry—not shown) can be used to discover available extension services 107, 109 for the applications 302, and therefore the registry 112 can contain such as but not limited to a deployment description (containing information such as extension service 107, 109 name, version, and description) as well as the location of this extension service 107, 109 in the repository 114. In this manner, the list of available extension services 107, 109 can be updated/maintained separately from the content (e.g. versions) of the application 302. It is recognized that any updates to the extension services 107, 109 available to the application 302 would be represented in the service document 320, further described below.

Referring to again to FIG. 1, in one embodiment the applications 302 can be stored in the repository 114 as a series of packages 301 (see FIG. 3), including application components (see FIG. 4), such as but not limited to presentation components 402, data components 400, message components 404 and application workflow components 406, as further defined below. The application packages 301 include metadata descriptors 307, written in a structured definition language (e.g. XML), and scripted instructions/elements using a standard scripting language (e.g. JavaScript™) or other scripting/programming languages known in the art for describing more complicated logic, as further described below. The metadata descriptors 307 can also include interdependencies of the definition content between the components 400, 402, 404, such as but not limited to message-data and presentation-data relationships.

The Device 100

Referring to FIG. 2, the devices 100 are communication devices 100 such as but not limited to mobile telephones, PDAs, two-way pagers or dual-mode communication devices. The devices 100 include a transceiver/modem 200 coupled via connection 218 to a device infrastructure 204. The transceiver 200 is connectable during operation of the devices 100 to the network 102 by a suitable channel, e.g. wireless RF or IR links, which enable the devices 100 to communicate with each other and with external systems (such as the data sources 106) via the network 102, and to coordinate the request/response messages 99 (see FIG. 7) between the client applications 302 and the data sources 106, as well as messages 105 between the application 302 and the extension services 107, 109. A wireless data transmission protocol can be used by the wireless network 102, such as but not limited to DataTAC, GPRS or CDMA.

Referring again to FIG. 2, the devices 100 also have a user interface 202, coupled to the device infrastructure 204 by connection 222, to interact with a user (not shown). The user interface 202 includes one or more user input devices such as but not limited to a QWERTY keyboard, a keypad, a trackwheel, a stylus, and a user output device such as an LCD screen display. If the screen is touch sensitive, then the display can also be used as the user input device as controlled by the device infrastructure 204. The user interface 202 is employed by the user of the device 100 to coordinate the messages 99, 105 over the system 10 (see FIGS. 1 and 7) as employed by provisioned/installed client applications 302 of a component framework 206 providing a runtime environment RE of the device 100, further described below.

Referring again to FIG. 2, operation of the device 100 is enabled by the device infrastructure 204. The device infrastructure 204 includes a computer processor 208 and associated memory module 210. The computer processor 208 manipulates the operation of the transceiver 200, the user interface 202 and the component framework 206 of the device 100 by executing related instructions, which are provided by an operating system and client applications 302 located in the memory module 210. Further, it is recognized that the device infrastructure 204 can include a computer readable storage medium 212 coupled to the processor 208 for providing instructions to the processor and/or to load/update client applications 302 in the memory module 210. The computer readable medium 212 can include hardware and/or software such as, by way of example only, magnetic disks, magnetic tape, optically readable medium such as CD/DVD ROMS, and memory cards. In each case, the computer readable medium 212 may take the form of a small disk, floppy diskette, cassette, hard-disk drive, solid-state memory card, or RAM provided in the memory module 210. It should be noted that the above listed example computer readable mediums 212 can be used either alone or in combination.

Framework 206

Referring again to FIG. 2, the framework 206 of the device 100 is coupled to the device infrastructure 204 by the connection 220. The framework 206 provides the native runtime environment RE for the client applications 302 and is an interface to the device 100 functionality of the processor 208 and associated operating system of the device infrastructure 204. The framework 206 provides a controlled, secure and stable environment on the device 100, in which the applications 302 execute in an application container 300. The application container 300 can be referred to as a smart host container for the client application 302, and can be responsible for analyzing message metadata (e.g., of the messages 99, 105) and for updating the representation of the metadata in the memory module 210, all according to the metadata descriptors 307 as provided for example in the components 400, 402, 404, 406 of the application 302 and the metadata 322 of the service document 320.

Figure 5:
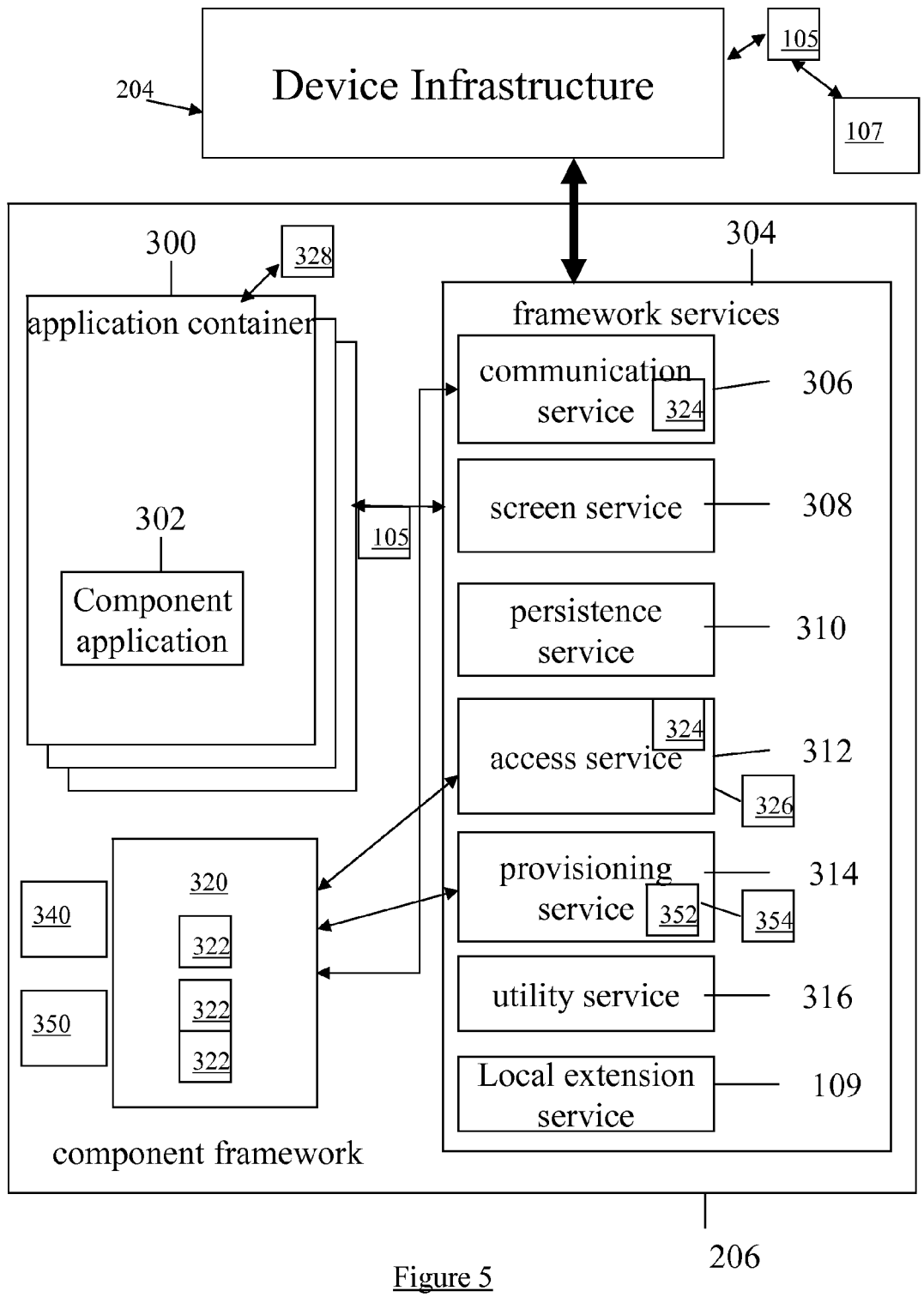
FIG. 5 is a block diagram of a component framework of FIG. 2.

The framework 206 can also provide an interface to the standard framework services 304, see FIG. 5, (a set of static standard built-in services such as but not limited to Communications, Screen, Data Persistence, and Security) and the dynamically hosted extension service(s) 107, 109 to the client applications 302. The application 302 has communications 214 with the application container 300 (including messages 105), which coordinates communications 216 with the framework services 304 (including messages 105 with the extension services 107, 109). The framework services 304 of the framework 206 coordinate communications via the connection 220 with the device infrastructure 204. Accordingly, access to the device infrastructure 204, user interface 202 and transceiver 200 is provided to the client applications 302 by the framework 206. It is recognized that a portion of the operating system of the device infrastructure 204 (see FIG. 2) can represent the application container 300. It is recognised that some of these static framework services 304 could be incorporated as part of the application 302, if desired, rather than represented as physically distinct from the application 302. This incorporation is contrary to the extension services 107, 109, which can be considered dynamic (e.g. optional) to the functionality of the application 302, and therefore are designed as distinct and separate services that are referenced in the service document 320 for dynamic association with the application 302, as further described below.

Referring again to FIG. 2, the client runtime environment RE of the framework 206 is preferably capable of generating, hosting and executing the applications 302, which when in the form of component applications is from the metadata descriptors 307. Further, specific built-in service 304 functions of the framework 206 can include support for language, coordinating memory allocation, networking, management of data during I/O operations, coordinating graphics on the output device of the user interface 202 via the device infrastructure 204 and providing access to core object oriented classes and supporting files/libraries. Examples of the runtime environments RE implemented by the framework 206, however modified to interact with the framework services 304, can include such as but not limited to Common Language Runtime (CLR) by Microsoft™ and Java Runtime Environment™ (JRE) by Sun™ Microsystems.

Figure 7:
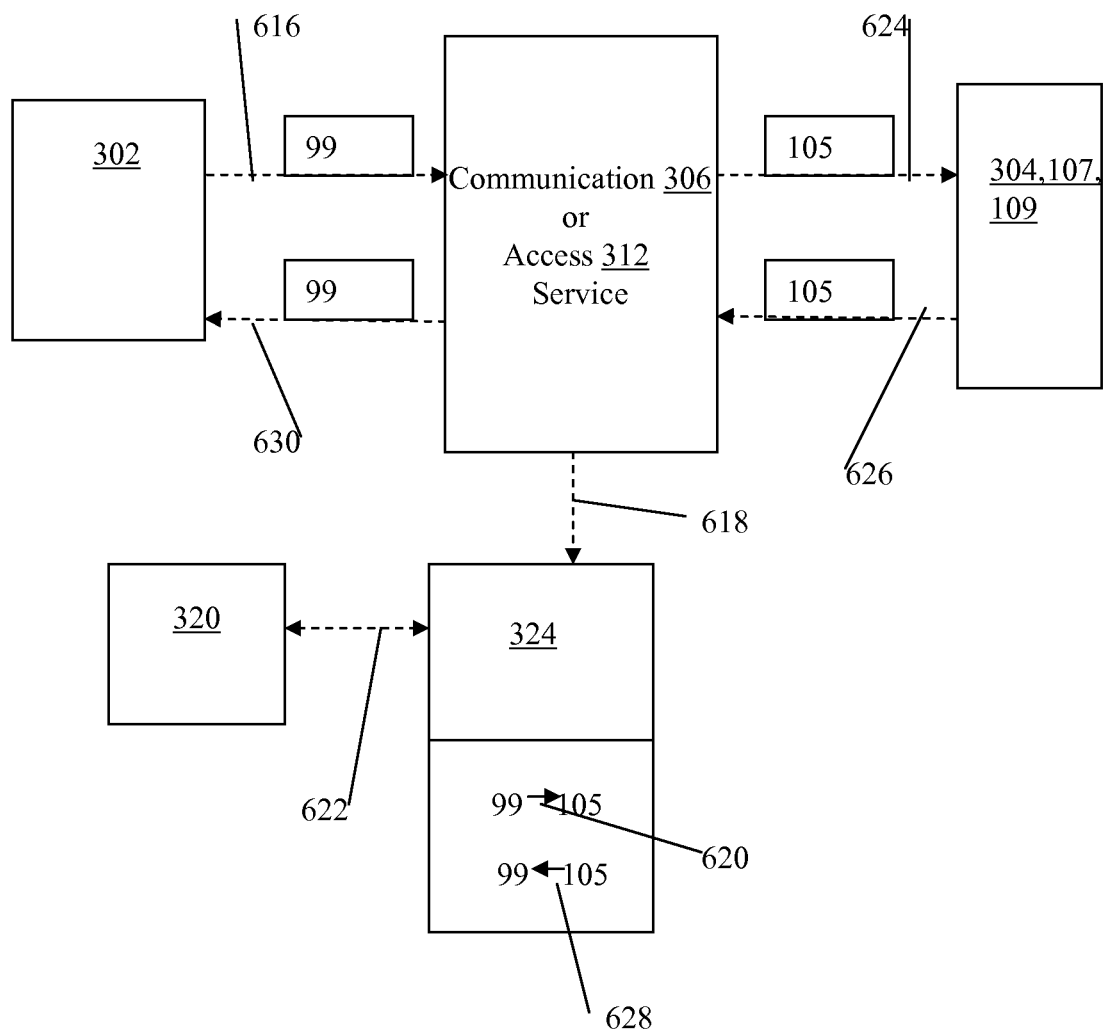
FIG. 7 is a further example operation of the system of FIG. 1.

Accordingly, the runtime environment RE of the framework 206 can support basic framework service 304 functions for the client applications 302 hosted on the device 100, including functions such as but not limited to:

provide a communications capability to send messages 99 to the data source 106 (see FIG. 1);

provide data input capabilities by the user on the input device to supply data parts for outgoing messages 99 of the data source 106 (see FIGS. 1 and 7);

provide data presentation or output capabilities for responses (incoming messages 99) or uncorrelated notifications of the data sources 106 (see FIG. 1) on the output device;

provide data storage services to maintain local client data in the memory module 210; and provide an execution environment for a scripting language for coordinating operation of the components 400, 402, 404, 406 (see FIG. 4) when part of the applications 302.

Further, it is recognized that the framework 206 is used to execute the applications 302 within the runtime environment RE and support access to the extension services 107, 109 via the messages 105. The application container 300 loads the application 302 (including components 400, 402, 404, 406 when provided) and can create native code which is executed by the processor 208 in the device infrastructure 204. The framework 206 therefore provides host application containers 300 for provisioning/installing executable version(s) of applications 302 (e.g. the metadata descriptors 307 of the components 400, 402, 404, 406) to create the actual provisioned applications 302 specific for each respective device infrastructure 204. Further, the framework 206 configures the dynamic binding of the applications 302 with the extension services 107, 109 though the metadata descriptors 322 of the service document 320, as further described below.

Further, it is recognized that the system 10 is configured so as to avoid compilation (i.e. static binding) between the application 302 and the extension services 107, 109. On the contrary, the application 302 and extension services 107, 109 interact at runtime (dynamic binding) as two separate processes. The container 300 process that encapsulates and executes the application 320 mediates between the application 302 and the processes running the extension services 107, 109. The messages 105 representing API calls to the extension services 107, 109 are passed by the container 300 to the extension services 107, 109 and back.

Further, it is recognized that the application gateway AG (or other network entity used in assisting in communication with remote extension services 107) can have an architecture (not shown) similar to the device 100, namely including modules such as but not limited to the transceiver 200, the infrastructure 204, the user interface 202, the framework 206, the computer processor 208, the memory module 210, the computer readable medium 212, the application container 300, and framework services 304.

Example Applications 302 as Component Applications

Figure 3:
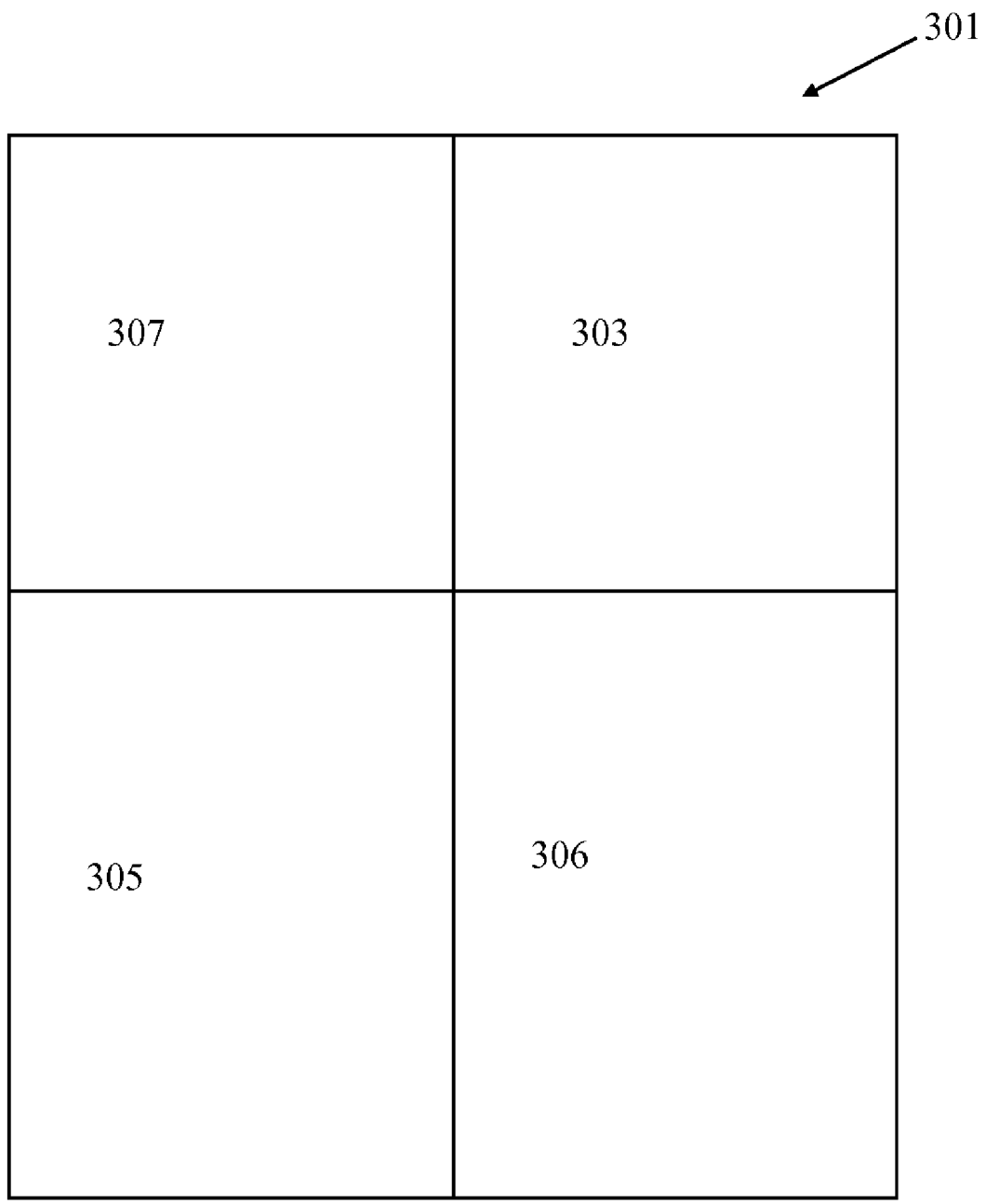
FIG. 3 is a block diagram of an application package of a component application of FIG. 2.

Referring to FIG. 3, the application packages/documents 301 have application elements or artifacts such as but not limited to XML definitions (e.g. metadata descriptors 307), mappings 303, application resources 304, and optionally resource bundle(s) 306 for localization support. For example, metadata descriptors 307 are XML definitions of application data 400, messages 404, presentation 402 components (optionally workflow 406), part of the application 302. It is recognised that XML syntax is used only as an example of any structured definition language applicable to definition of the applications 302. The application 302 can be expressed using a structured definition language, such as but not limited to XML, and a platform neutral scripting/programming language, such as but not limited to ECMAScript/Java Script™, with defined components 400, 402, 404, 406 conforming with an associated definition document (e.g. Document Type Definition (DTD)).

Referring again to FIG. 3, application mapping 303 defines the relationship of content in the application messaging to backend operation of the data sources 106, whereby the gateway AG utilizes this mapping information 303 during communication of the application 302 request/response messages 99 (see FIG. 7) between the runtime environment RE, of the devices 100, and the data sources 106. The mapping information 303 is generated as an annotation to the data source 106 schema. Further, there may be multiple such mappings 303 in the case where more than one backend data source 106 is utilized by the application 302. The resources 305 are one or more resources (images, soundbytes, media, etc. . . . ) that are packaged with the application 302 as static dependencies. The resource bundles 306 can contain localization information for each language supported by the application 302.

In terms of a component-based application 302, the container 300 can manage the application 302 lifecycle on the device 100 (provisioning, execution, deletion, etc.) and can be responsible for translating/provisioning the metadata descriptors 307 representing the application 302 into an efficient executable form on the device 100.

Referring to FIG. 4, a block diagram of the component application 302 comprises the data components 400, the presentation components 402 and the message components 404, which are coordinated by workflow components 406 through interaction with the application container 300 via communication link 214 (see FIG. 2) once provisioned. The structured definition language application metadata descriptors 307 (e.g. XML) can be used to define the components 400, 402, 404 as a series of metadata records, which consist of a number of pre-defined elements representing specific attributes of a resource such that each element can have one or more values. Each metadata schema typically has defined characteristics such as but not limited to; a limited number of elements, a name of each element, and a meaning for each element. Example metadata schemas include such as but not limited to Dublin Core (DC), Anglo-American Cataloging Rules (AACR2), Government Information Locator Service (GILS), Encoded Archives Description (EAD), IMS Global Learning Consortium (IMS), and Australian Government Locator Service (AGLS). Encoding syntax allows the metadata of the components 400, 402, 404 to be processed by the processor 208, and encoding schemes include schemes such as but not limited to XML, HTML, XHTML, XSML, RDF, Machine Readable Cataloging (MARC), and Multipurpose Internet Mail Extensions (MIME).

Data Component 400

Referring again to FIG. 4, the data components 400 define data entities which are used by the component application 302. Data components 400 comprise a group of named, typed fields and define what information is required to describe the data entities, and in what format the information is expressed. For example, the data component 400 may define information such as but not limited to an order which is comprised of a unique identifier for the order which is formatted as a number, a list of items which are formatted as strings, the time the order was created which has a date-time format, the status of the order which is formatted as a string, and a user who placed the order which is formatted according to the definition of another one of the data components 400.

Example XML Data Components 400

```
<data name="Order">
    <item name="orderId" type="Number" key="true"/>
    <item name="items" type="String" array="true"/>
    <item name="user" comp="true" compName="User"/>
    <item name="orderStatus" type="String"/>
</data>
...
```

Message Component 404

Referring again to FIG. 4, the message components 404 comprise a group of named, typed fields and define the format of messages 99 (see FIG. 7) used by the application 302 to communicate with external systems, such as the data sources 106, other devices 100. For example, one of the message components 404 may describe information such as but not limited to a message 99 for placing an order which includes the unique identifier for the order, the status of the order, and notes associated with the order. It is recognised that data definition content of the components can be shared for data 400 and message 404 components that are linked or otherwise contain similar data definitions. It is recognized that the message components 404 are considered part of the metadata 307 and are statically bound to the content of the application 302, which is contrary to the dynamic binding potential of the metadata 322 describing communication messages 105 with the extension services 107, 109.

Example XML Message Components 404

```
<msg name="ordConfirmation" type="response"
action="mhConfirmation">
    <part name="orderId" type="String" />
    <part name="status" type="String" />
</msg>
...
```

Presentation Components 402

Referring again to FIG. 4, the presentation components 402 define the appearance and behavior of the component application 302 as it displayed by a user interface of the devices 100. The presentation components 402 may define screens, labels, edit boxes, buttons and menus, and actions to be taken when the user types in an edit box or pushes a button. Example presentation components 402 are such as but not limited to; a label, a separator, an image, a button, an edit field, a text area, a single-selection list, a multi-selection list, a drop-list, a checkbox, a radio button, or a screen containing a group of other presentation components 402. The presentation components 402 can be used to define a login screen, a order information screen, a delivery information screen, an order list screen, and an order status screen for presenting on a user interface of the device 100. Accordingly, the presentation components 402 can specify GUI screens and controls, and actions to be executed when the user interacts with the component application 302 using the user interface. It is recognised that data definition content of the components can be shared for data 400 and presentation 402 components that are linked or otherwise contain similar data definitions.

Example XML Presentation Components 402

```
<screen name="scrConfirmation" title="Order Confirmation"
param="Order">
    <layout type="vertical">
        <widget type="label" value="Order Confirmation Result:"/>
```

-continued

```
        < widget type="edit" value="@Order.orderStatus"/>
    </layout>
    ...
    <menu>
        <item label="Continue" navigate="@scrMain"/>
        ...
    </menu>
</screen>
...
```

Workflow Components 406

Referring again to FIG. 4, the workflow components 406 of the application 302 define processing that occurs when an action is to be performed, such as an action specified by a presentation component 402 as described above, or an action to be performed when messages 99 arrive from the application gateway AG (see FIG. 1). The workflow components 406 can also be used to define and/or coordinate the communication of messages 105 with the various forms of the extension services 107, 109. Presentation, workflow and message 99, 105 processing are defined by the workflow components 406. The workflow components 406 can be represented as a series of instructions in a programming language (e.g. object-oriented programming language and/or a scripting language, such as but not limited to ECMAScript™, and can be (for example) compiled into native code and executed by the runtime environment RE, as described above. Further, the workflow components 406 can be embedded in the other components 400, 402, 404 as metadata descriptors 307 used to link components 400, 402, 404 to one another to facilitate work flow. An example of the workflow components 406 may be to assign values to data, manipulate screens, or send the message 99, 105 (see FIG. 7). As with presentation components 402, multiple workflow definitions can be created to support capabilities and features that vary among devices 100. ECMA (European Computer Manufacturers Association) Script is a standard script language, wherein scripts can be referred to as a sequence of instructions that is interpreted or carried out by another program rather than by the computer processor. Some other example of script languages are Perl™, Rexx™, VBScript™, JavaScript™, and Tcl/Tk™.

Referring to FIG. 4, the application 302 is structured using component architecture such that when the device 100 (see FIG. 1) receives a response message 99 from the application gateway AG (or message 105 for the extension services 107, 109) containing message data, the appropriate workflow component 406 interprets the data content of the message 99, 105 according to the appropriate message definitions (e.g. definitions of message component 404 as part of the application 302 or definitions of messages 105 contained in the metadata 322 of the service document 320). The workflow component 406 then processes the data content and inserts the data according to the format as prescribed by the corresponding data component 400 for subsequent storage in the device 100. Further, if needed, the workflow component 406 also inserts the data into the appropriate presentation component 402 for subsequent display on the display of the device 100. A further example of the component architecture of the applications 302 is for data input by a user of the device 100, such as pushing a button or selecting a menu item. The relevant workflow component 406 interprets the input data according to the appropriate presentation component 404 and creates data entities which are defined by the appropriate data components 400. The workflow component 406 then populates the data components 400 with the input data provided by the user for subsequent storage in the device 100. Further, the workflow component 406 also inserts the input data for subsequent sending of the input data as data entities to the extension services 107, 109.

Example ECMAScript Workflow Components 406

```
<actions>
    <function name="mhConfirmation">
        key = ordConfirmation.orderId;
        order = Order.get(key);
        order.orderStatus = ordConfirmation.status;
        scrConfirmation.display(order);
    </function>
    ...
</actions>
```

Further, referring to FIG. 4, the application 302 also includes references 408 (e.g. generic) of the extension services 107, 109 (for example by name) embedded in the application 302 code, for example in any one or more of the components 400, 402, 404, 406. The references 408 provide a means for linking the executable applications 302 to the extension services 107, 109 through the metadata descriptors 322 used to define the messaging 105 for communication between the extension service(s) 107, 109 and the corresponding applications 302 configured by the application code to reference the extension service(s) 107, 109. This configuration can include use of the application workflow (e.g. workflow components 406) to manipulate communication (and associated data processing) with the extension services 107, 109 in the context of the executing application 302.

Accordingly, in view of the above, the client runtime environment RE loads the metadata contained in the component 400, 402, 404, 406 definitions with the embedded references 408 and the builds the executable version of the application 302 as specified in the artifacts 301 of the application 302 packages (see FIG. 3) and/or including dynamic binding of all required services 107, 109 as defined in the service document 320. The executable application 302 is then loaded in the application container 300 and thereby configured to communicate with appropriate extension services 107, 109. For example, there are two operational models for client runtime: template-based native execution and metadata-based execution. With the template-based native execution model the runtime environment RE hosts data, message, and screen templates pre-built on the device 100 using the native code. When the application artifacts of the packages/documents 301 are provisioned, the templates are filled with the metadata-defined parameters of the metadata descriptors 307 and the executable application 302 in the native format is generated. The workflow script (e.g., ECMAScript) of the workflow components 406 could be either converted to native code or executed using an interpreter to native code redirector (e.g., ECMAScript to native code), where the redirector interprets calls to the scripting language into operations on native components. With the metadata-based execution, the runtime environment RE of the framework 206 either keeps component 400, 402, 404, 406 definitions in a representation format such as XML, which are parsed during execution time or uses native representation of XML (for example) nodes. During execution on the device 100, the application container 300 can act as a native runtime engine that operates on the metadata descriptors 307 of the components 400, 402, 404, 406 rather than on native component entities. It is recognized that the template-based approach can be more performance efficient over the metadata-based execution, but can require a more sophisticated execution environment and more memory resources.

Before each application 302 is loaded onto the device 100, the workflow components 406 can be compiled into native code or an intermediate form such as Java™ bytecodes. The intermediate form can then be converted into native code on the device 100. Compiling the workflow components 406 before they are loaded onto the device 100 can help provide that the code comprising the workflow components 406 only has to be interpreted at one level on the device 100. Alternatively, workflow components 406 may be loaded onto the device 100 as code written in an interpreted language, which is processed by an interpreter (not shown) on the device 100 before it is converted into native code. Workflow components 406 may alternatively be comprised of code written in any compiled or interpreted language, as appropriate for the application 302.

Runtime Environment RE Employed Services 304 and Extension Services 107, 109

The metadata descriptors 322 in the service document 302 can include a group of named, typed fields and define the format of the messages 105 for communications between the extension services 107, 109 and the executable application 302. It is recognized that the extension services 107, 109 are in addition to those core built-in services of the framework services 304 that can be provided by the device 100, e.g. as common for all applications 302, except for when the extension services 107, 109 are to be used as a substitute for one of the built-in services of the framework services 304. Further, it is recognized that the extension services 107, 109 can be implemented as plug-ins to the framework services 304. Further, it is recognized that communication interface information of the extension services 107, 109 (e.g. the service metadata descriptors 322) is in addition to communication information (e.g. the message components 404) associated with the data sources 106, such that preferably the communication interface information of the extension services 107, 109 is used to dynamically bind the application 302 for subsequent communication with the extension services 107, 109 (using messages 105).

The client runtime environment RE of the framework 206 (see FIG. 2) can generate component templates based on the metadata descriptors 307 (and metadata descriptors 322), as further described below, when the components 400, 402, 404, 406 of the application 302 and the contents of the service document 320 are provisioned on the device 100. This delayed binding can allow generic definitions of the component application 302 (when used as component-based) to be run on a wide variety of system environments, represented by various different devices 100. Further, the delayed/dynamic binding can be used to supplement the use of the built-in services 304 with the extension services 107, 109. It is recognized that these extension services 107, 109 are utilized by the provisioned application 302 and can be implicitly referenced to in the application metadata descriptors 307 of the components 400, 402, 404, 406 (or in the script of the workflow components 406) by the references 408. Accordingly, at compilation time the component dependencies between the components 400, 402, 404, 406 as well as the runtime links between the components 400, 402, 404, 406 and the services 107, 109, are configured for implementation by the runtime environment RE.

As further described below with reference to FIG. 5, the built-in framework services 304 include such as but not limited to a communication service 306, a screen service 308, a persistence service 310, an access service 312, a provisioning service 314 and a utility service 316, as well as potentially any plug-ins of extension services 109 (stored/hosted on the device 100) and potentially any plug-ins of extension services 107 (resident/hosted off the device 100). It is recognized that the local extension services 109 can be defined to include other software applications running on the device 100, if desired. In this case, the service document 320 and an API converter 326 facilitate inter-application communication with both component-based and non-component-based applications 302, as further described below.

As noted above, it is emphasized that the description of the communication interface of the extension services 107, 109 (via the service metadata descriptors 322) is distinct from the description of the application 302 provided by the application metadata descriptors 307. The application metadata descriptors 307 are used to describe the configuration of a cooperating set of the components 400, 402, 404, 406 executable in the container 300 to interact with the services 304 and the extension services 107, 109 to provide a complete executable application 302 suitable for stand-alone operation or for optional interaction with the networked data source 106. Accordingly, updates of the service document 320 and of the application 302 can be implemented separately. For example, the application 302 can refer explicitly to an extension screen service X, however the definition of the communication interface of the extension screen service X can be linked via an appropriate version of the metadata descriptors 322 to support various device capabilities, e.g. colour screen as opposed to monochrome. In this example, operation of the application 302 via the metadata descriptors 307 remains unchanged (i.e. the application 302 as defined by the metadata descriptors 307 is unaware of any screen colour capabilities of the device 100), while the framework 206 of the colour-enabled device 100 is aware and dynamically binds the colour-enabled version of the extension screen service X to the application 302. The following provides further details of the framework services 304 and adaptation for the extension services 107, 109. It is recognized that in the below context the extension services 107, 109 are discussed as plug-ins to the framework services 304, as an example only.

Communication Service 306

Referring to FIGS. 1 and 5, the communication service 306 manages connectivity between the applications 302 and the external system 10, such as the data sources 106 and the remote extension services 107, 109. For example, messages 99 (see FIG. 7) are sent to the data source 106 and messages 105 to the extension services 107, 109 by the communication service 306 on behalf of the applications 302, in the optional case where the application 302 is configured for communication with selected data sources 106. The communication service 306 also receives data of the messages 99 from the data sources 106 and delivers the data to the applications 302 executing in the container 300. Data received by the communication service 306 can include synchronous responses to requests made by the component applications 302 and asynchronous data pushed to the device 100 by the extension services 107, 109. The communication service 306 also manages connectivity when the device 100 is disconnected from the network 102. The device 100 can be disconnected from the network 102 when it is in an area which is not covered by the wireless network 102, or when the wireless transceiver 200 is disabled. When the device 100 is in disconnected mode, messages 99 sent by the applications 302 can be queued by the communication service 306, and sent once the device 100 is reconnected to the network 102. Further, it is recognized that the communication service 306 can act as an intermediary between the application 302 and the local extension service(s) 109 (e.g. another application 302 provisioned on the device 100).

The communication service 306 can communicate with the extension services 107, 109, on behalf of the applications 302, using the service document 320 containing sets of metadata descriptors 322 (e.g. XML) for describing service request messages (via synchronous operation messaging 105) and service messages (via asynchronous operation messaging 105) for each of the extension services 107, 109. The metadata descriptors 322 can represent message type definitions of the structured definition language messages 105 communicated between the application 302 and the extension services 107, 109. The service document 320 includes application-to-service API definitions for the structure and type of API parameters passed from the applications 302 to the extension services 107, 109 and back. Further, the service document 320 can include potentially URIs of the listed extension services 107, 109 potentially not local to the device 100 when loading is attempted for the extension services 107, 109 during provisioning of the application 302. The API service metadata descriptors 322 define the specific communication method prescribed by a computer operating system or by an application program by which the application 302 can make communicated requests of the extension services 107, 109.

In the asynchronous messaging 105 case, the extension service 107, 109 response, if any, could be defined as a callback API, for example. The communication service 306 can include an API converter 324 that performs parameter parsing and native call API invocation facilitated through the passing of metadata descriptor-defined messages 105 between the extension service 107, 109 and the application 302. The parameters could be passed in any format, such that the service document 320 defines the appropriate API parameter structure and types referred to implicitly by the corresponding references 408 in the application 302 code. Accordingly, the service document 320 is used by the network system 10 to provide a standard structured definition language interface (e.g. XML) that is shared by both the extension services 107, 109 and the application 302 (and/or container 300) for facilitating messaging 105 between the application 302 and the extension services 107, 109. The service document 320 is therefore used to define all calls (e.g. APIs) between the extension services 107, 109 and the application 302 and is to be used by the API converter 324 to convert the messaging 105 content and format to suit the appropriate content/form for consumption by the respective application 302 or extension service 107, 109. It is also noted that the service document 320 can be used to contain the URIs (e.g. network 102 or device 100 addresses) held by the extension services 107, 109 in addition to the messaging 105 format, as desired.

An example of the remote extension service 107 is as follows. Example: need to enable location-based (e.g. GPS) services 107 by:

1) using a synchronous mode of interaction (e.g. service call using the metadata descriptor 307-defined messaging 99 in combination with the API message 105 definition in the service document 320), the message 105 getLocation is communicated, wherein the location extension service 107 returns device location data in the synchronous message 105 over the network 102. The API converter 324 of the communication service 306 interprets the API parameters included in the returned service message 105 (using the metadata descriptors 322 of the service document 320), transforms the location data into the appropriate message 99 format (according to the message component 404 of the requesting application 302) and then delivers the converted message 99 (including location data) to the application 302 via link 216 (see FIG. 2). The application 302 would then use the location data to execute some location-related business logic (e.g. request map of the current location); or 2) alternatively, using the asynchronous mode of interaction (service message using the metadata descriptor-defined messaging 105 in combination with the API definition of the service document 320): the message 105 refreshLocation is communicated, wherein the location extension service 107 asynchronously obtains the request from the application 302 (subscription message 105 over the network 102), interpreted via the API converter 324 as described above. Subsequently, when the GPS location is refreshed, the location extension service 107 sends the location data back to the device 100 as the asynchronous application message 105, which is then interpreted by the API converter 324 and then forwarded to the application 302 as an internal message 99 via link 216.

In interaction with the extension services 107, 109 the communication service 306 acts as a messaging engine to facilitate messaging 99, 105 between the application 302 and the requested extension service 107, 109 using the API descriptions represented by the metadata descriptors 322 of the service document 320. The location of the extension service 107, 109 is known to the communication service 306, the application container 300, and/or the application 302 as the destination of the messages 105 requesting information/processing by the requested extension service 107, 109.

Referring to FIG. 7, the function of the communication service 306 includes conversion of the message 105 format/content between the structured definition language format/content used by the application 302 (and/or container 300) and the different format/content used by the extension service 107, 109 based on the service document 320 contents. For example, the application 302 can be configured for receipt and consumption of XML-based messages 99 while the extension service 107 can be configured for receipt and consumption of messages 105 based on the different format not necessarily known to the application 302 and/or container 300. In this case, the application 302 would use the communication service 306 as the interface entity between the application 302 and the extension service 107, 109, such that the application 302 would perceive the extension service 107, 109 to be an XML-based messaging 99 extension service 107, 109, rather than as the actual different based messaging 105 extension service 107, 109. Similarly, the extension service 107, 109 would perceive the application 302 to be the different based messaging 105 application 302, rather than as the actual XML-based messaging 99 application 302.

Screen Service 308

Referring again to FIGS. 1 and 5, the screen service 308 manages the visual representation of the applications 302 as they are displayed on the output device of the user interface 202 (see FIG. 2). The visual representation can include images, graphical user interface (GUI) controls and windows, and text. The screen service 308 manages a screen stack, which controls what the user sees on the output device of the device infrastructure 204.

Persistence Service 310

Referring again to FIGS. 1 and 5, the persistence service 310 allows the applications 302 to store data in the memory module 210 (see FIG. 2) of the device infrastructure 204. Data store operations are provided by the persistence service 310 in a transparent fashion to the applications 302. Further, the runtime environment RE of the component framework 206 facilitates for actions performed on metadata content (i.e. XML data) of the messages 99, 105, thereby providing for persistence of data.

Access Service 312

Referring again to FIGS. 1 and 5, the access service 312 provides the applications 302 access to other software applications which are present on the device 100. For example, the access service 312 may allow the applications 302, such as but not limited, to access a software application to send email, place a phone call, or access contact information which is stored in the memory module 210 (see FIG. 2). Access can be provided to other software applications on the device 100 in a secure manner. The access service 312 also allows other software applications which are present on the device 100 to access the applications 302. It is recognized that the other software programs may be part of the operating system of the device infrastructure 204 (see FIG. 2). Further, it is recognized that the access service 312 can provide for messaging 99, 105 (see FIG. 7) between the executing application 302 and the local extension services 109.

The access service 312 can communicate with the local extension services 109, on behalf of the applications 302, using the service document 320 containing sets of metadata descriptors 322 (e.g. XML) for describing service calls (via synchronous local messaging 105) and service messages (via asynchronous local messaging 105) for each of the local extension services 109. The service document 320 includes application-to-service API definitions for the structure and type of parameters passed from the applications 302 to the service 109 and back. In the asynchronous messaging 105 case, the service 109 response, if any, could be defined as a callback API, for example. The access service 306 can include the API converter 324 that performs parameter parsing and native call API invocation facilitated through the passing of metadata descriptor-defined messages 105 between the local extension service 109 and the application 302. The parameters could be passed in any format, such that the service document 320 defines the appropriate API parameter structure and types.

An example of the local extension service 109 is as follows. Example: need to enable location-based services 109 by:

1) using the synchronous mode of interaction (e.g. service call using the metadata descriptor-defined messaging 99 in combination with the API message 105 definition in the service document 320), the message 105 getLocation is communicated, wherein the location extension service 107 returns device location data in the synchronous message 105. The API converter 324 of the communication service 306 interprets the API parameters included in the returned service message 105 (using the metadata descriptors 322 of the service document 320), transforms the location data into the appropriate message 99 format (according to the message component 404 of the requesting application 302) and then delivers the message 99 (including location data) to the application 302 via link 216 (see FIG. 2). The application 302 would then use the location data to execute some location-related business logic (e.g. request map of the current location); or 2) alternatively, using the asynchronous mode of interaction (service message using the metadata descriptor-defined messaging 105 in combination with the API definition of the service document 320): the message 105 refreshLocation is communicated, wherein the location extension service 109 asynchronously obtains the request from the application 302 (subscription message 105), interpreted via the API converter 324 as described above. Subsequently, when the GPS location is refreshed, the location extension service 109 sends the location data back to the access service 312 as the asynchronous application message 105, which is then interpreted by the API converter 324 and then forwarded to the application 302 as an internal message 99 via link 216. It is recognized in the case of the access service 312, that the messaging 99, 105 between the local extension service 109 and the application 302 is done on (i.e. internal to) the device 100. This is compared to the case of the communication service 306, where the messaging 99, 105 between the remote extension service 107 and the application 302 is done off (i.e. external to) the device 100 over the network 102.

It is recognized that the functionality of the access service 312 and the communication service 306 can be combined (e.g. having only one shared API converter 324 rather than individual API converters 324), as desired. Further, either of the services 306, 312 could be used to facilitate both local 109 and remote 107 extension service messaging 105. Another option is for the application 302 to communicate directly with the local extension services 109 using the service document 320 and a shared API converter 324 (not shown), rather than via the access service 312. Further, for communicating with the remote extension services 109, the application 302 could communicate with the access service 312, which would decide whether the requested extension service 107, 109 was either remote or local, respectively, using a extension service table 326. The table 326 can include extension service 107, 109 configuration information, such as but not limited to a basic description of the requested service 107, 109, the location of the service 107, 109 (on or off the device 100), the priority of the requested service 107, 109 (in the case where one service supersedes another available service—further described below), and the status of the service 107, 109 (either on-line or off-line). In the case of the local service 109, the access service 312 (or the application 302 directly if informed of local location by the access service 312) would communicate with the requested local service 109 via internal messages 105. In the case of the remote service 107, the access service 312 (or the application 302 directly if informed of remote location by the access service 312) would communicate with the requested remote service 107 via external messages 105 through the communication service 306.

In interaction with the extension services 107, 109, the access service 312 acts as a messaging engine to facilitate messaging 105 between the application 302 and the requested extension service 107, 109, using the API descriptions represented by the metadata descriptors 322 of the service document 320. The location of the extension service 107, 109 is known to the access service 312, the application container 300, and/or the application 302 as the destination of the messages 105 requesting information/processing by the requested extension service 107, 109.

Referring to FIG. 7, the function of the access service 312 can include conversion of the message 99, 105 format/content between the structured definition language (e.g. XML) format/content used by the application 302 (and/or container 300) and the different (for example) format/content used by the extension service 107, 109, based on the service document 320 contents. For example, the application 302 can be configured for receipt and consumption of XML-based messages 99 while the extension service 107, 109 can be configured for receipt and consumption of messages 105 based on a different messaging format not necessarily known to the application 302 and/or container 300. In this case, the application 302 would use the access service 312 as the interface entity between the application 302 and the extension service 107, 109, such that the application 302 would perceive the extension service 107, 109 to be an XML-based messaging 99 extension service 107, 109, rather than as the actual differently based messaging 105 extension service 107, 109. Further, though the access service 312, similarly the extension service 107, 109 would perceive the application 302 to be a differently based messaging 99 application 302, rather than as the actual XML-based messaging 99 application 302. It is also recognized that the messages 99 and 105 could be of the same format in certain cases.

Provisioning/Linking Service 314

Referring again to FIGS. 1 and 5, the provisioning/linking service 314 (also referred to as a module) manages the provisioning/installing of software applications 302 on the device 100, including interpretation of the metadata descriptors 307 to generate an executable version of the application 302. Application 302 provisioning can include such as but not limited to: requesting and receiving new and updated applications 302; configuring the applications 302 for access to services which are accessible via the network 102; modifying the configuration of application 302 and services; and removing applications 302 and services. It is also recognized that the service 314 can install an already application 302 in the application container 300, and can facilitate the generation of the application container 300 when installing the executable application 302. Further, it is recognized that the service 314 can be responsible for dynamically validating extension service 107, 109 runtime links (via the service metadata descriptors 322 and the references 408) for the application 302 as well as initiate searching for the extension service 107, 109 dependencies, on and/or off the device 100.

Further, the service 314 can include a parser module 352 for interpreting the service document 320 (or other extension sources of the extension service 107, 109 metadata descriptors 322—e.g. a DTD or a table 340) to identify the extension service APIs to be used in provisioning the application 302, in order to associate the extension services 107, 109 with the executable version of the application 302. The service document 320 (or other extension sources of the extension service 107, 109 metadata descriptors 322) can include the metadata descriptors 322 defining the extension service 107, 109 APIs and/or the name and URI for downloading via the network 102 the respective extension service 107, 109 with the corresponding metadata descriptors 322 (if not otherwise locally available). It is recognized that the parser module 352 can be part of the general runtime environment RE of the device 100 (or application gateway AG or other network entity—not shown), if desired. In general, the parser module 352 can be a program, for example part of the service 314, that receives input in the form of sequential source program instructions, interactive online commands, markup tags, or some other defined interface and breaks them up into parts (for example, the nouns (objects), verbs (methods), and their attributes or options), which can then be managed by the service 314 for provisioning of the application 302). The parser module 352 may also check to see that all input has been provided in the service document 320 that is necessary for provisioning of the application 302 to include the referenced extension services 107, 109. Further, the parser module 352 can have a document generator module 354 for generating the service document 320 to include any service metadata descriptors 322 retrieved via the network 102 (e.g. via the UDDI registry 112).

Accordingly, the process by which the extension services 107, 109 are registered with the application 302 comprises:

1) the application 302 dependent on the extension service 107, 109 should mention this extension service in the deployment descriptor (e.g. the service document 320, the table 340), such that when the application deployment descriptor is loaded on the mobile device 100 during a discovery/provisioning process, software of the framework 206 checks dependencies and loads required extension services 107, 109 into existing container framework 206;

2) at runtime the application 302 "calls" the extension service 107, 109 by sending the message 99 to the extension service URI, such that the container 300 (or other appropriate message 99 processor) finds the "plug-in" extension service 107, 109 and forwards the service message 105 to the service process (could be already running or started by the container 300 on demand);

3) the extension service 107, 109 parses the message 105 and converts the message fields into API call parameters, such that when the message 105 is processed the extension service 107, 109 wraps the results as the response message 105 which is eventually forwarded back to the container 300 process (e.g. message processor) for conversion to the appropriate message 99 for consumption by the application 302; and 4) finally, the messaging 99, 105 interaction executes in synchronous (container 300 process waits for the extension service 107, 109 response) or asynchronous mode, as desired. Further, it is noted that if the extension service 107, 109 is not available, then message 99 from application 302 is ignored and/or an error code is returned. This messaging 99, 105 model provides for identical behaviour across different devices 100 as well as dynamic application 302 suite/bundle extension and changes by replacing the extension services 107, 109 or loading different extension service 107, 109 versions for different device 100 types/models (e.g. PocketPC and Palm), as provided for the in the service metadata descriptors 322.

Utility Service 316

Referring again to FIGS. 1 and 5, the applications 302 use the utility service 316 to accomplish a variety of common tasks. For example, the utility service 316 can perform data manipulation such as conversion of strings to different formats on behalf of the applications 302.

In view of the above, it is recognized that the framework services 304 and the extension services 107, 109 cooperate to provide functionality to the application 302, and are included as part of the application 302 as metadata descriptors 300, 322 and/or other application definition content. For example, a deployment descriptor 328 of the application 302 would specify URIs of the required extension services 107, 109 to be used for subsequent operation of the application 302. A Uniform Resource Identifier can be defined as a formatted string of characters that serves as an identifier for a resource, including the location or address of the resource on the network 102 and how that resource should be accessed. URIs are used in HTML to identify the anchors of hyperlinks; URIs in common practice include Uniform Resource Locators (URLs) and Relative URLs (RELURL). It is noted that URI generalizes Uniform Resource Locator. Access to the extension services (e.g. service 107, 109 API metadata descriptors 322 as per the service document 320) can be loaded via the network 102 from the specified URIs. As a result, the applications 302 have access to the functionality of the device 100 and the associated shared extension services 107, 109 without having to implement them. Since the functionality provided by the extension services 107, 109 and shared framework services 304 is functionality that can be present in most typical applications 302, the framework 206 may have only preferably one copy of the service code (actual service or API for access to the remote extension service 107) which implements these services 304, 107, 109 present on the device 100, regardless of the number of installed applications 302 using these services 304, 107, 109.

Example Operation of Extension Service 107, 109 Configuration

Figure 6:
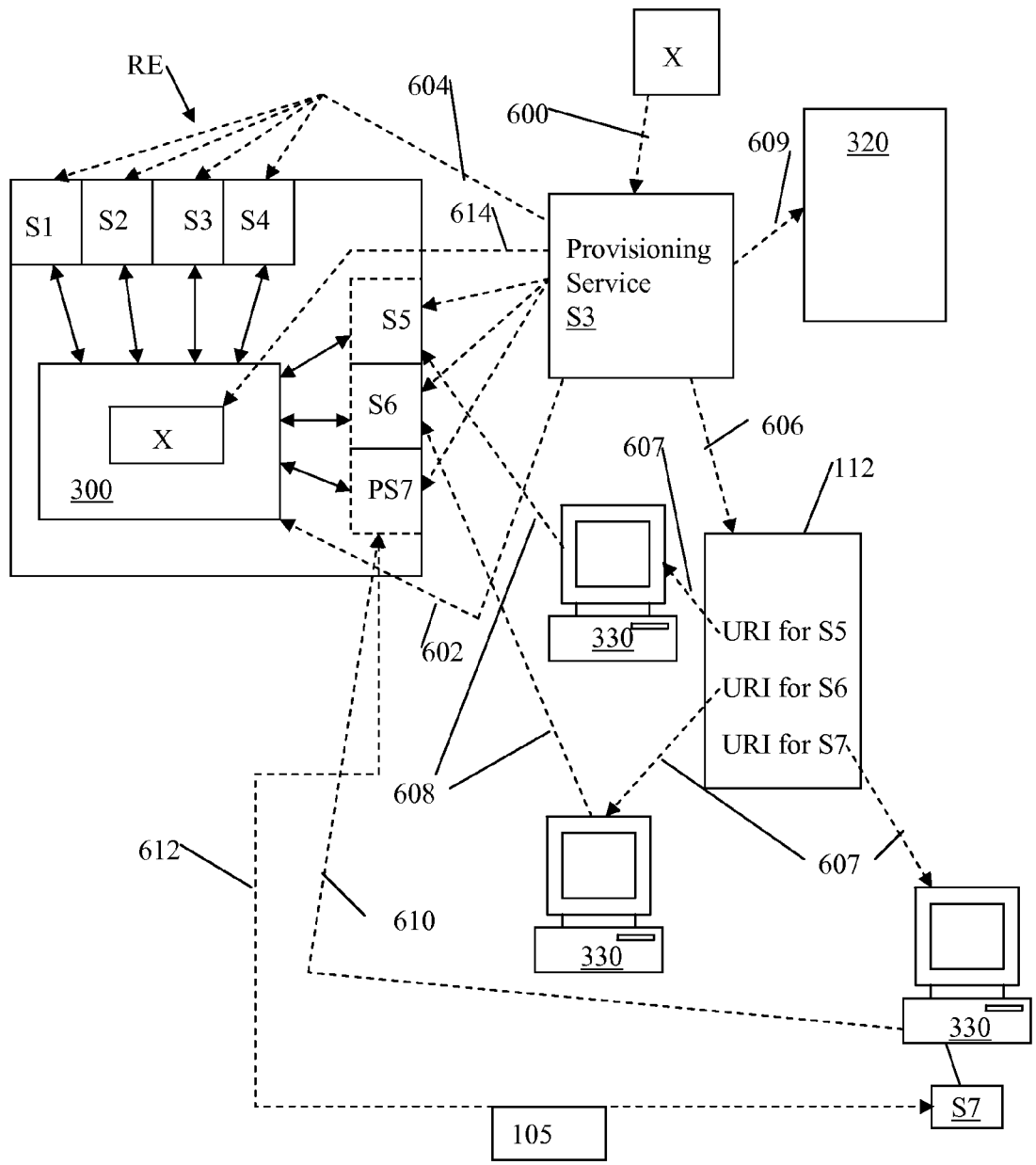
FIG. 6 is a schematic of an example operation of the system of FIG. 1.

Referring to FIG. 6, a selected application X (e.g. application 302) requires example services S1, S2, S3, S4, S5, S6, S7.

For example, built-in framework services 304 including the screen service 308 (S1), the persistence service 310 (S2), the provisioning service 314 (S3), and the printing service (S4—an optional but already installed framework service 304). The local extension services 109 include a scientific calculator library S5 and a statistics package S6. The remote extension services 107 include a proprietary, resource-intensive calculation service S7. Accordingly, the runtime environment RE of the device 100 is configured to run the executable application X using the services S1, S2, S3, S4, S5, S6, S7, in the context of communication with a selected data source 106 (i.e. the application X is a client application of the data source 106) or as a stand-alone application X (e.g. a computer game or other none-network 102 dependent application).

The following example description for dynamic binding, and subsequent interaction with the extension service 107, 109, of the application X, is given for on-device execution/hosting. However, it is recognized that similar modules and steps can be used for off-device execution/hosting (e.g. done by the application gateway AG or other external network entity).

Referring again to FIGS. 1 and 6, the provisioning service S3 accesses 600 the application X code over the network 102 from the application repository 114 directly (or via the application gateway AG) and creates 602 the appropriate application container 300 for receiving the application X. The service S3 then validates 604 the component dependencies of the received application X (including runtime links for services S1, S2, S3, S4, S5, S6, S7) and notes that framework services S1, S2, S3 are available, extension service S4 is available, but extension services S5, S6, S7 are not currently available on the device 100. The service S3 (acting as the provisioning service 314) then initiates 606 a search for the missing services S5, S6, S7 via the service UDDI registry 112, using supplied service URIs to locate the locations 330 of the missing extension services S5, S6, S7. The service URIs can be provided with the application X in such as but not limited to; the service document 320, the Document Type Definition (DTD) that accompanies or is otherwise associated with the application X, or by the service S1, S2, S3, S4, S5, S6, S7 names and corresponding URIs already known by the entity (e.g. service S3) provisioning the application X. In the case of the DTD, the DTD can contain the same metadata descriptors 322 as in the service document 320 for defining the APIs and locations of the extension services 107, 109, and can therefore be defined as a type of service document 320. It is recognized that the DTD can be a specific document defining and constraining definitions or a set of statements that follow the rules of the Standard Generalized Markup Language (SGML) or of the Extensible Markup Language (XML), a subset of SGML. The DTD identifies what the markup language means in the application X. For example in the case of a text document, the DTD identifies separate paragraphs, identify topic headings, and so forth and how each is to be processed. The provisioning service S3 can retrieve 607 further information (e.g. service metadata descriptors 322) about the extension services S5, S6, S7 from the registry 122 and/or from the locations 330. The provisioning service S3 can then supplement or otherwise transform the information to be represented by appropriate service metadata descriptors 322 (as per the format of the service document 320) and then update 609 the service document 320 with this information for use by the API converter 324, for example, in formulating the messages 99, 105 between the application X and the extension services S5, S6, S7.

Referring again to FIG. 6, the actual extension services S5, S6 are downloaded 608 from their locations 330 to be associated with the compiled application X on the device 100. It is recognized that the device 100 resource capabilities should be able to accommodate the installation of the downloaded extension services S5, S6. In the case of extension service S7 (a remote extension service 107), a proxy service PS7 is instead downloaded 610 for installation on the device 100, such that resource needs of the extension service S7 are deemed inappropriate for the device 100 capabilities and/or the extension service S7 has a proprietary communication format. In this case, the document 320 contains information of the API for the proxy service PS7, which then brokers 612 communication messages 105 between the itself and the remote extension service S7. It is recognized that the locations 330 can be of the network 102, internal to the device 100 (e.g. the entity hosting the application 302), or a combination thereof.

Referring again to FIGS. 5 and 6, 7, the service S3 then provisions 614 the application X, with appropriate references to the built-in services 304 and the extension services 107, 109, suitable for installation on the device 100 in the application container 300. It is noted that some of the services 304, 107, 109 can be accessed directly by the application X/container 300 rather than using the API converter 324 and associated service document 320, as desired. Referring again to FIG. 7, once the application X is installed on the device 100, the application X requests 616 information/operations via message 99 of the extension service 107, 109. The appropriate communication service 306 and/or access service 312 then uses 618 the API converter 324 to convert 620 the request message 99 into an appropriate request message 105 suitable for consumption by the extension service 107, 109, through identifying 622 the appropriate API metadata descriptors 322 of the service document 320. For example, this conversion process 620 can include loading the metadata descriptors 322 of the service document 320 and then matching the message definitions to the available extension services 107, 109 to assist in the conversion. The communication 306 and/or access service 312 then sends 624 the converted request message 105 to the extension service 107, 109. Upon processing of the request message 99 (e.g. consumption of native expressed name/value pairs in the message 105 expressed in the extension service's 107, 109 native format), the extension service 107, 109 then sends 626 the response message 105 back to the device 100 via the communication 306 and/or access service 312, which then converts 628 the response message 105 into an appropriate response message 99 suitable for consumption by the application X/container 300 and then sends 630 the converted response message 99. It is recognized to those skilled in the art that the above messaging 99, 105 example can be similarly described using asynchronous messaging 99, 105, where the request messages 99, 105 are subscriptions and the response messages 99, 105 are the notifications. Further, it is recognized that in the event that the message definition of the extension service 107, 109 is not found in the service document 320 (or Table 340), for whatever reason, then an error handler (not shown) can be used to intervene in the application X compilation process and/or the conversion of the messages 99, 105.

In the above description, it is noted that the application X during provisioning can be extension service 107, 109-aware (e.g. in the DTD and/or the service document 320 is defined the extension service 107, 109 name and URI used to find the appropriate extension service API definition for use by the API converter 324). The device 100 through the runtime environment RE can be extension service 107, 109-aware (e.g. the runtime environment RE has a table 340—see FIG. 5—similar to the service document 320 that has a listing of the known extension services 107, 109 with metadata descriptors 322 of the APIs for use by the API converter, including the URI(s) for the needed extension services 107, 109). Further, the application X and/or device 100 may not be extension service 107, 109 aware and the communication interface information of the service document 320 must be found and used to help provision the application X with appropriate service APIs defined in the retrieved communication interface information (e.g. a supplemental one of the service document 320, including the needed service metadata descriptors 322, can be pushed to the device 100 upon request from the application gateway AG or other network entity for use in downloading the unknown extension services 107, 109).

Service Manager 800

Figure 8:
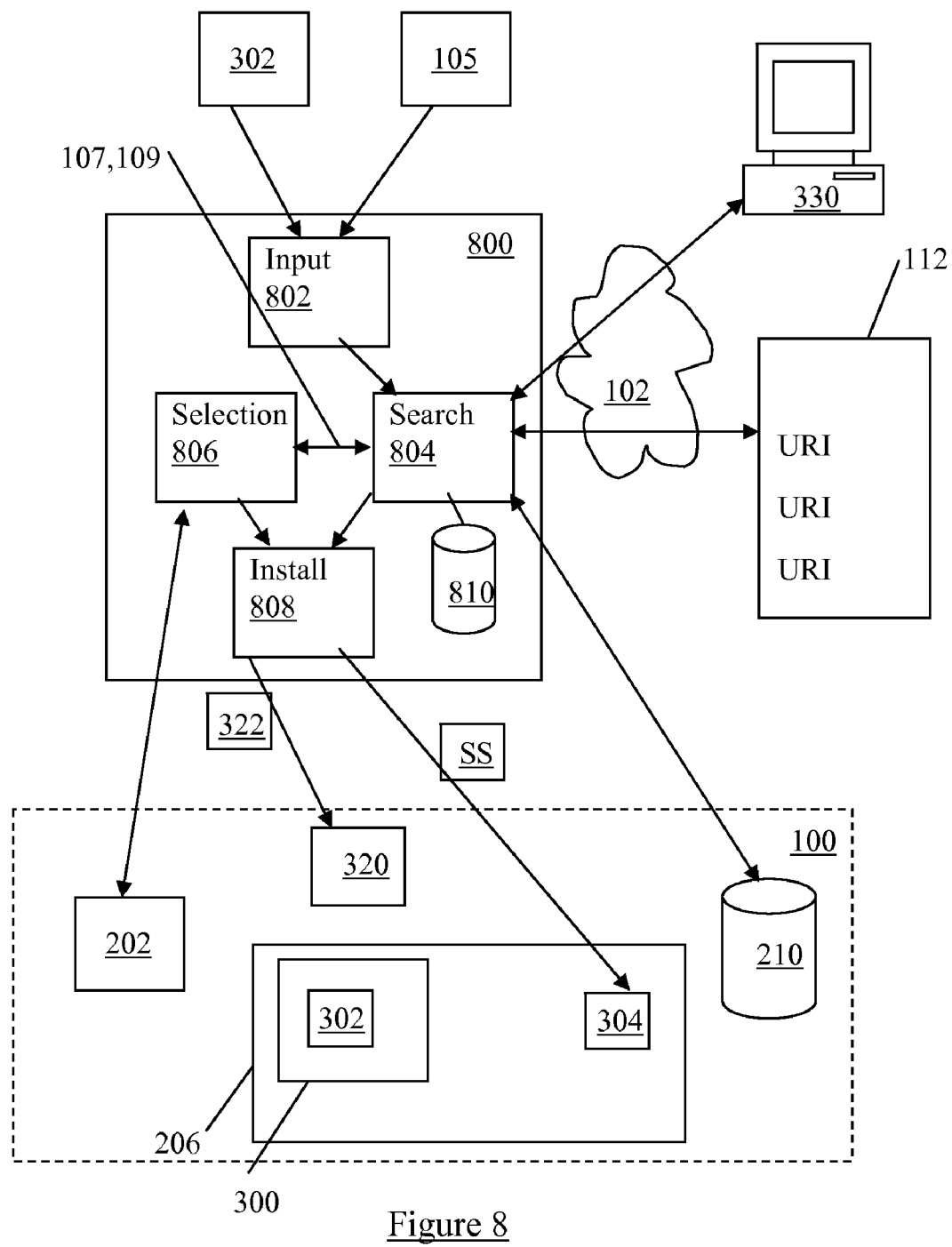
FIG. 8 is a further example operation of the system of FIG. 1.

Referring to FIGS. 5 and 8, a further embodiment of the network system 10 is shown where the runtime environment RE (or other provisioning entity) has a service manager 800 for use in selecting one extension service from a plurality of possible extension services 107, 109 during the provisioning process, or for example during execution of the application 302 in response to a specific data processing need. For instance, the extension services 107, 109 could be provisioned dynamically, e.g. the extension service URI could be obtained as a part of the network message 99 from a server (e.g. application gateway AG) or from another service 304, 107, 109 (example: the network message 99 returns via message 99 binary data and location (e.g. URI) of the extension service 107, 109 that could process this data). The service manager 800 dynamically loads the required extension service 107, 109 ad-hoc and, upon provisioning, passes data to the newly loaded extension service 107, 109 for processing. It is noted that the message 99 could return different types of binary data and therefore the extension service type/location may only be resolvable at runtime (i.e. on the device 100).

Referring again to FIG. 8, the service manager 800 (e.g. represented by the communication service 306, access service 312, or a combination thereof) has an input module 802 for receiving the dependencies of the application 302 and/or the message 99 that contains required, but yet uninstalled, extension services 107, 109. A search module 804 is used to look for the required extension service(s) 107, 109 based on the name and location (e.g. URI) listed in the message 99 or application dependencies (e.g. in an updated service document 320 as received in the network message 99), as received by the input module 802. The search module 804 uses the extension service 107, 109 URIs and names to look for, for example, both in local storage (e.g. device memory 210) and over the network 102 in the registry 112, in order for eventual installation of the extension service 107, 109 (or service proxy). The search module 804 can facilitate the downloading of the found extension services 107, 109 and their associated communication interface information (e.g. service metadata descriptors 322) and storing in a local service database 810. The search module 804 makes available the downloaded extension service(s) 107, 109 and/or the communication interface information available to a selection module 806 or an install module 808. The selection module 806 is used for displaying dialog boxes on the user interface 202 for facilitating selection by the user of the device in the case of multiple available extension services 107, 109 based on the search criteria of URI and service name. Once the required extension service 107, 109 is selected (e.g. by the user or automatically by the device runtime RE based on settings), the install module 808 installs the selected extension service 107, 109 in the services 304 of the device 100. Further, the install module 808 can be responsible for updating the service document 320 with the service metadata descriptors 322 for use in generation of the communication messages 105 by the API converter 324 (see FIG. 5).

Figure 9:
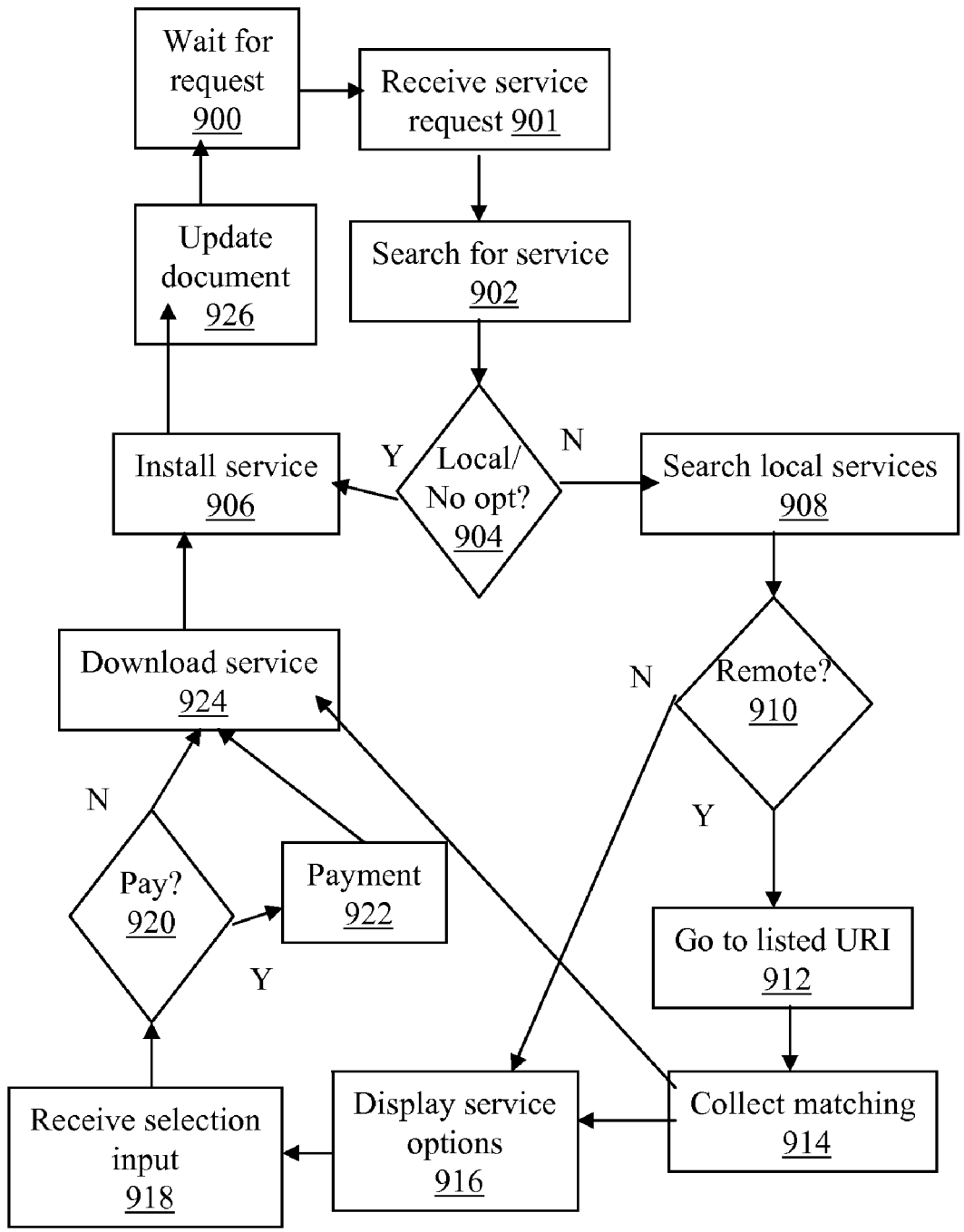
FIG. 9 is a further example operation of the system of FIG. 1.

Referring to FIGS. 8 and 9, for the application 302 for example, there are available three different calculator services, an enhanced versus standard screen service, etc. At the time of provisioning of the application 302 (or in response to the network message 99 received by the provisioned application 302 for data processing), the service manager 800 while waiting 900 for an extension service SS request, receives 901 the request via the input module 802 and then uses the search module 804 to search 902 for the required extension service(s) SS. A decision 904 is made by the search module 804 if the requested service SS is local with no other optional services (e.g. the required service SS is deemed the only option to satisfy the application 302 service dependencies and/or the message 105 data processing requirements), which can be based on a user and/or system setting for the application 302 and/or extension service SS installation procedure. If the requested service SS is locally found (e.g. in storage 210) and determined to be the only service SS option, then the requested service SS is installed 906 or otherwise linked to the application 302 and the service document 320 is updated with the service metadata descriptors 322. If there are more service SS options (or suspected options) or the requested service SS is determined to be located off the device 100, then the search module 804 looks 908 locally for one or more matches for the service search criteria (e.g. service name, service function, services available to requesting application 302 and/or data type processing, etc.). If the service options are deemed 910 only for locally available services (e.g. from the device storage 210), them the service SS options are sent to the selection module 806. Otherwise, the search module 804 searches 912 for further matches 914 of the requested service(s) SS using any available service URI(s) and other search criteria (e.g. service name, service function, services available to requesting application 302 and/or data type processing, etc.). Once all of the matching services have been identified, these service options are passed to the selection module 806 for displaying 916 on the user interface 202 (see FIG. 2). The displayed service SS options are for choosing 918 between the possible extension service SS choices. It is recognized that the extension service SS could be used to replace or otherwise override one of the built-in framework services 304. This choice can be temporary or permanent, depending upon the settings of the device 100. The extension service SS choices displayed 916 could include such as but not limited to: adding other service choices, selecting from the choices provided, replacing a built-in framework service 304 (or other existing extension services 107, 109) with the selected extension service SS choice, and ignoring the option of extension service SS choice and instead defaulting to already installed/linked services 304, 107, 109. It is also recognized that the use of extension services 107, 109 could be used to upgrade the application 302 (e.g. reprovision the application 302 from the components 400, 402, 404, 406 using a modified set of the services 304, 107, 109). It is recognized that another selection option may be for the selection module 806 to automatically select the most applicable matched extension service SS based on user/system predefined selection settings (e.g. least expensive, least memory-intensive, most recommended/highest priority).

Referring again to FIG. 9, the selection module 806 can also coordinate the display and subsequent processing 922 of a payment screen(s) if the selected extension service SS has a charge associated with the download or otherwise use of the extension service SS. For example, before downloading is allowed from the location 330, the extension service SS provider needs payment to obtain a copy of, or otherwise license the use of, the selected extension service SS. Once payment for the selected extension service SS is completed, the search module 804 downloads 924 the selected extension service SS and then the install module 808 installs 906 the selected extension service SS for use by the application 302. Further, the install module 808 updates 926 the service document 320 with the service metadata descriptors 322 used to describe the communication interface of the selected extension service SS. It is recognized that the service metadata descriptors 322 can be supplied as part of the service download and/or the install module 808 can generate the appropriate service metadata descriptors 322 based on the structure and type of API parameters identified from a supplied description of the selected extension service SS.

It is recognized that the above described payment for extension services 107, 109, facilitating dynamic provisioning/installing of the paid for extension service(s) 107, 109 can be applicable in the enterprise marketplace (e.g. Google™ and UDDI published registries).

I claim:

1. A method for dynamically generating an extended, dynamically linked version of an installed application on a mobile device, the method comprising:
receiving, in a computer processor of the mobile device, a request for an extended service of the installed application, the extended service being described in a service document, the service document including service metadata descriptors to identify a communication interface associated with the extension service, the installed application interacting with the extension service through communication messages defined in a structured definition language, the service metadata descriptors describing the communication interface including structure and type of parameters expected by the extension service for use in manipulation of the communication messages, the service metadata descriptors further being distinct from an application metadata descriptor of the application;
searching the extension service for additional matches if the requested service is located remotely or there are additional extension service options;
automatically selecting a most applicable matched extension service option based on predefined selection settings;
installing the extension service; and
updating the service document with the service metadata descriptors,
wherein the extension service is selected from the group consisting of: a local extension service configured for hosting on the mobile device, and a remote extension service configured for hosting on a network entity communicating with the mobile device via the network.

2. The method according to claim 1, wherein the extension service is installed directly if the requested extension service is local with no other optional services.

3. The method according to claim 1, further comprising:
displaying the additional extension service options on a user interface of the mobile device; and
selecting one of the additional extension service options.

4. The method according to claim 3, wherein the selecting is temporary or permanent depending upon a setting of the mobile device.

5. The method according to claim 3, wherein the displayed additional extension service options are selected from the group consisting of: adding other service choices, selecting from the choices provided, replacing a built-in service with a selected extension service, and defaulting to installed services.

6. The method according to claim 1, further comprising identifying a name and a respective URI of the extension service to be used in accessing the service metadata descriptors.

7. The method according to claim 1, further comprising providing a runtime environment including an application container for the executable application such that the extension service is external to the application container.

8. The method according to claim 7, further comprising assembling the service document to include additional service metadata descriptors retrieved using the URI, the additional service metadata descriptors for use in communications between the installed application and the extension service using the communication messages, the communications facilitated through a messaging engine.

9. A mobile device executing an extended, dynamically linked version of an application the mobile device comprising:
a computer processor;
a service manager selecting an extension service from a plurality of extension services and dynamically loading the selected extension service, the service manager comprising:
an input module receiving a request for an extended service of the installed application, the extended service being described in a service document, the service document including service metadata descriptors to identify a communication interface associated with the extension service, the installed application interacting with the extension service through communication messages defined in a structured definition language, the service metadata descriptors describing the communication interface including structure and type of parameters expected by the extension service for use in manipulation of the communication messages, the service metadata descriptors further being distinct from an application metadata descriptor of the installed application;
a search module searching the extension service for additional matches if the requested service is located remotely or there are additional extension service options and automatically selecting a most applicable matched extension service option based on predefined selection settings; and
an install module installing the extension service, and updating the service document with the service metadata descriptors,
wherein the extension service is selected from the group consisting of: a local extension service configured for hosting on the mobile device, and a remote extension service configured for hosting on a network entity communicating with the mobile device via the network.

10. The mobile device according to claim 9, wherein the extension service is installed directly if the requested extension service is local with no other optional services.

11. The mobile device according to claim 9, wherein the selection module displays the additional extension service options on a user interface of the mobile device for facilitating selection by a user of the mobile device.

12. The mobile device according to claim 11, wherein the displayed additional extension service options are selected from the group consisting of: adding other service choices, selecting from the choices provided, replacing a built-in service with a selected extension service, and defaulting to installed services.

13. The mobile device according to claim 9, wherein the search module facilitates downloading of the extension service.

14. The mobile device according to claim 13, wherein the search module makes the downloaded extension service available to the selection module or the install module.

15. The mobile device according to claim 9, wherein the installed application is a component-based application having at least one of a message component, a data element, a presentation component, and a workflow component.

16. The mobile device according to claim 9, further comprising a communication module for sending and receiving communication messages directed to the remote extension service.

17. The mobile device according to claim 9, further comprising a converter module for converting a format of the communication messages between an application format and a service format, the application format and the service format included in the service metadata descriptors of the service document.

18. A computer readable storage medium coupled to a computer processor for providing instructions to the processor to execute a method comprising:

receiving a request for an extended service of the installed application, the extended service being described in a service document, the service document including service metadata descriptors to identify a communication interface associated with the extension service, the installed application interacting with the extension service through communication messages defined in a structured definition language, the service metadata descriptors describing the communication interface including structure and type of parameters expected by the extension service for use in manipulation of the communication messages, the service metadata descriptors further being distinct from an application metadata descriptor of the installed application;

searching the extension service for more matches if the requested service is located remotely or there are additional extension service options;

automatically selecting a most applicable matched extension service option based on predefined selection settings;

installing the extension service; and updating the service document with the service metadata descriptors, wherein the extension service is selected from the group consisting of: a local extension service configured for hosting on the mobile device, and a remote extension service configured for hosting on a network entity communicating with the mobile device via the network.

* * * * *